(12) United States Patent
Liu

(10) Patent No.: US 10,400,597 B2
(45) Date of Patent: Sep. 3, 2019

(54) NON-CONCENTRIC PROTRUDING SHAFT FIXED BEARING RECIPROCATING IMPACT PART FOR IMPLEMENTING RECIPROCATING IMPACT PART NON-CONCENTRIC PROTRUDING SHAFT FIXED BEARING METHOD

(71) Applicant: Suhua Liu, Shandong (CN)

(72) Inventor: Suhua Liu, Shandong (CN)

( * ) Notice: Subject to any disclaimer, the term of this patent is extended or adjusted under 35 U.S.C. 154(b) by 517 days.

(21) Appl. No.: 15/115,278

(22) PCT Filed: Jan. 29, 2015

(86) PCT No.: PCT/CN2015/071782
§ 371 (c)(1),
(2) Date: Jul. 29, 2016

(87) PCT Pub. No.: WO2015/113504
PCT Pub. Date: Aug. 6, 2015

(65) Prior Publication Data
US 2017/0002656 A1  Jan. 5, 2017

(30) Foreign Application Priority Data

Jan. 29, 2014 (CN) .......................... 2014 1 0042607
Aug. 1, 2014 (CN) .......................... 2014 1 0379365

(51) Int. Cl.
E21C 25/02 (2006.01)
E21C 31/04 (2006.01)
(Continued)

(52) U.S. Cl.
CPC .............. *E21C 25/02* (2013.01); *E02F 3/966* (2013.01); *E21C 27/28* (2013.01); *E21C 31/02* (2013.01); *E21C 31/04* (2013.01); *E21C 35/20* (2013.01); *F16C 3/18* (2013.01); *F16C 9/02* (2013.01); *F16C 9/04* (2013.01); *F16C 19/54* (2013.01)

(58) Field of Classification Search
CPC ................................. E21C 25/02; E21C 31/04
See application file for complete search history.

(56) References Cited

U.S. PATENT DOCUMENTS 1,643,221 A  9/1927 Metzner
4,815,543 A  3/1989 Lenzen et al.
(Continued)

FOREIGN PATENT DOCUMENTS

CN  202483570 U  10/2012
CN  202745687 U  2/2013
(Continued)

OTHER PUBLICATIONS

International Search Report for PCT/CN2015/071782—the whole document, dated Apr. 2015.
(Continued)

*Primary Examiner* — Sunil Singh

(57) ABSTRACT

A reciprocating impact part non-concentric protruding shaft fixed bearing method, comprising: arranging an eccentric shaft section (12) and a power shaft section (11), arranging eccentric shaft section (12) bearings (8) on the section (12), arranging power shaft section bearings (5) on the section (11); arranging power shaft section bearing retaining rings (10) and eccentric shaft section bearing retaining rings (9) to block the bearings (5) and (8), respectively; arranging connecting rods (2) as separate snap-fitted crankshaft connecting rods or integrated sleeved crankshaft connecting rods, fitting the latter onto the bearing (8) arranging a base (1) arranging the bearings (5) thereon, such that they support the sections (11) and (12) arranging a power source component (3), such that it drives the section (11) to rotate and the section (11) drives the rods in reciprocating impact. Also provided is a non-concentric protruding shaft fixed bearing reciprocating impact part for implementing the method.

15 Claims, 13 Drawing Sheets

(51) Int. Cl.
*E21C 31/02* (2006.01)
*E21C 27/28* (2006.01)
*E21C 35/20* (2006.01)
*F16C 3/18* (2006.01)
*E02F 3/96* (2006.01)
*F16C 19/54* (2006.01)
*F16C 9/02* (2006.01)
*F16C 9/04* (2006.01)

(56) References Cited

U.S. PATENT DOCUMENTS

2016/0265355 A1* 9/2016 Liu .................. E21C 27/00
2017/0009579 A1* 1/2017 Liu .................. E21C 27/28

FOREIGN PATENT DOCUMENTS

| CN | 202882909 U | 4/2013 |
| CN | 103195420 A | 7/2013 |
| CN | 201410042607.6 A | 8/2015 |
| CN | 201410379365.X A | 8/2015 |
| WO | WO2014190764 A2 * | 12/2014 |
| WO | WO2015027672 A1 * | 3/2015 |
| WO | WO2016202309 A2 * | 12/2016 |

OTHER PUBLICATIONS

Written Opinion of SIPO for PCT/CN2015/071782—the whole document, dated May 2015.

* cited by examiner

Enlarged structural schematic diagram of I

US 10,400,597 B2

NON-CONCENTRIC PROTRUDING SHAFT FIXED BEARING RECIPROCATING IMPACT PART FOR IMPLEMENTING RECIPROCATING IMPACT PART NON-CONCENTRIC PROTRUDING SHAFT FIXED BEARING METHOD

FIELD OF THE INVENTION

The present invention belongs to the field of machinery, and specifically relates to a non-concentric protruding shaft fixed bearing reciprocating impact part for implementing a reciprocating impact part non-concentric protruding shaft fixed bearing method.

BACKGROUND OF THE INVENTION

At present, when a reciprocating impact heading machine advances, reciprocating impact teeth are perpendicular to a matter to be excavated in order to carry out reciprocating impact discharge, meanwhile, the reciprocating impact heading machine is high in lump rate, energy-saving, environment-friendly and high in efficiency, and the price of lump coal is higher than double the price of fine coal in the present market, so the reciprocating impact heading machine has a broad use prospect. However, it is discovered in the product promotion process that although the reciprocating impact heading machine has very high excavation efficiency, a rotating crankshaft of a reciprocating impact mechanism thereof has the problems of extremely short service life and the like because the installed bearing bushes with small size bear large impact reaction and large impact lateral force, and bearing bushes or separate bearings having separate structures are poor in swing and impact resistance, liable to damage and difficult to replace and maintain after being damaged, so that the reciprocating impact heading machine cannot continuously work for a long term and can hardly meet the requirement of field use; common retaining rings for fixed bearings and the like are mostly clamping springs, the clamping springs are convenient to use when serving as the retaining rings, but may be damaged by strong reciprocating impact vibration force and lateral force and quickly deform and drop when being applied to a crankshaft of the reciprocating impact heading machine, so that the bearings shift and the reciprocating impact heading machine cannot work; moreover, a reciprocating impact discharge excavating head of the reciprocating impact heading machine does not have the function of conveying materials backwards, so that mass reciprocating impact discharge is accumulated on a surface to be excavated and cannot be conveyed to a transport system for carrying away, and then the performance, promotion and application of the reciprocating impact heading machine are seriously restrained.

In order to solve the above problems and promote and apply the energy-saving, environment-friendly and high-efficiency reciprocating impact heading machine for improving the use value of materials, the present invention provides a non-concentric protruding shaft fixed bearing reciprocating impact part for implementing a reciprocating impact part non-concentric protruding shaft fixed bearing method.

SUMMARY OF THE INVENTION

The present invention is realized by adopting the following technical solution: a non-concentric protruding shaft fixed bearing reciprocating impact part for implementing a reciprocating impact part non-concentric protruding shaft fixed bearing method includes power shaft sections, eccentric shaft sections, power shaft section bearings, eccentric shaft section bearings, power shaft section bearing retaining rings, eccentric shaft section bearing retaining rings, connecting rods, a power source component, a case and the like, wherein the power shaft sections are separately connected or integrated with the eccentric shaft sections, the eccentric shaft section bearings and the like are arranged on the eccentric shaft sections, the power shaft section bearings and the like are arranged on the power shaft sections, the eccentric shaft section bearings are eccentric shaft section separate bearings or eccentric shaft section integrated bearings or the like, the power shaft section bearing retaining rings and the eccentric shaft section bearing retaining rings respectively block the power shaft section bearings, the eccentric shaft section bearings and the like, or the power shaft section bearing retaining rings and the eccentric shaft section bearing retaining rings are made into integrated non-concentric connected retaining sleeves, the external diameters of the power shaft section bearing retaining rings of the non-concentric connected retaining sleeves are smaller than the internal diameters of power shaft section bearing outer supporting rings, the external diameters of the eccentric shaft section bearing retaining rings are smaller than the internal diameters of eccentric shaft section bearing outer supporting rings, the power shaft section bearing retaining rings and the eccentric shaft section bearing retaining rings form height differences, the spaces of the height differences avoid friction between the rotating eccentric shaft section bearing retaining rings and the power shaft section bearing outer supporting rings and/or avoid friction between the rotating power shaft section bearing retaining rings and the eccentric shaft section bearing outer supporting rings, the non-concentric connected retaining sleeves are arranged between the power shaft section bearings and the eccentric shaft section bearings or between the eccentric shaft section bearings, blocking sleeve rotating prevention components and the like are arranged on the non-concentric connected retaining sleeves and the eccentric shaft sections and/or the non-concentric connected retaining sleeves and the power shaft sections, the blocking sleeve rotating prevention components prevent the non-concentric connected retaining sleeves from rotating relative to the power shaft sections and the eccentric shaft sections, the connecting rods are separate snap-fitted crankshaft connecting rods or integrated sleeved crankshaft connecting rods or the like, the integrated sleeved crankshaft connecting rods are sleeved onto the eccentric shaft section bearings, the power shaft section bearings are arranged on one side or two sides of the case, the power shaft section bearings support the power shaft sections, the eccentric shaft sections and the like to rotate, and the power source drives the power shaft sections to drive the connecting rods and the like in reciprocating impact.

The circle section center of the eccentric shaft section and the circle section center of the power shaft section are arranged in such a way: the circle section of the power shaft section is arranged within the circle section of the eccentric shaft section, the distance between the circle section center of the power shaft section and the circle section center of the eccentric shaft section is half of a reciprocating impact stroke, an eccentric shaft section integrated bearing is integrally installed on the eccentric shaft section, the power shaft section is separately connected or integrated with the eccentric shaft section, the non-concentric connected retaining sleeve is arranged between the power shaft section bearing and the eccentric shaft section bearing to block the power shaft section bearing, the eccentric shaft section bearing and the like from shifting, a retaining shoulder and the like are formed on one side of the eccentric shaft section, while the non-concentric connected retaining sleeve or a clamping spring or a retaining ring or the like is arranged on the other side of the eccentric shaft section.

Each power shaft section bearing retaining ring includes a clamping spring or a spacer bushing or the like, and one or more eccentric shaft sections and the like are adopted.

The eccentric shaft section is provided with an anti-rotating hole or an anti-rotating groove or the like, the non-concentric connected retaining sleeve is provided with a boss or the like matched with the anti-rotating hole or the anti-rotating groove, and the boss is matched with the anti-rotating hole or the anti-rotating groove or the like to prevent the non-concentric connected retaining sleeve from rotating relative to the eccentric shaft section.

An anti-rotating key and the like are arranged in the internal diameter of the non-concentric connected retaining sleeve, the power shaft section and/or the eccentric shaft section are correspondingly provided with a key groove and the like, and the anti-rotating key is pushed into the key groove to prevent rotating, or both the non-concentric connected retaining sleeve and the power shaft section are provided with the key groove, and the anti-rotating key is respectively arranged in the key grooves of the non-concentric connected retaining sleeve and the power shaft section.

The blocking sleeve rotating prevention component includes an anti-rotating pin, a pin hole and the like, the eccentric shaft section and/or the non-concentric connected retaining sleeve are provided with pin holes and the like, the pin holes are through holes or blind holes or the like, the anti-rotating pin is arranged in the pin hole to prevent the non-concentric connected retaining sleeve from rotating relative to the eccentric shaft section, the blind hole prevents the anti-rotating pin from dropping, the eccentric shaft section is provided with a blind hole, the non-concentric connected retaining sleeve is provided with a through hole and the like, the anti-rotating pin penetrates through the through hole of the non-concentric connected retaining sleeve, one end of the anti-rotating pin is arranged in the blind hole of the eccentric shaft section while the other end is arranged in the through hole of the non-concentric connected retaining sleeve, the anti-rotating pin is prevented from dropping from the through hole of the non-concentric connected retaining sleeve by spot welding or gluing or in other manners, or both the eccentric shaft section and the non-concentric connected retaining sleeve are provided with the blind hole and the like, one end of the anti-rotating pin is arranged in the blind hole of the non-concentric connected retaining sleeve while the other end is arranged in the blind hole of the eccentric shaft section.

A retaining shoulder and the like are formed on one side of the eccentric shaft section, while the non-concentric connected retaining sleeve and the like are arranged on the other side, the retaining shoulder and the non-concentric connected retaining sleeve jointly prevent the eccentric shaft section bearing from shifting in the axial direction of the eccentric shaft section, and the internal diameter of the non-concentric connected retaining sleeve is snap-fitted with the power shaft section to realize radial positioning. The non-concentric connected retaining sleeve is provided with a detaching jackscrew hole and/or the eccentric shaft section or the power shaft section is provided with a hoisting hole and the like.

The non-concentric protruding shaft fixed bearing reciprocating impact part further includes a raking mechanism and the like, the raking mechanism includes a raking transmission component and the like, the raking transmission component and the power shaft section are separated or separately connected or integrated or connected in other manners, the raking transmission component is arranged inside or outside the case or arranged in other manners, the raking mechanism further includes a raking rotating component, a raking arm and the like, the raking transmission component drives the raking rotating component and the like to rotate, and the raking rotating component drives the raking arm and the like to rotate for raking.

The raking transmission component is a raking transmission sprocket or a raking transmission gear or a raking transmission belt pulley or a raking transmission frictional wheel or a raking transmission coupling or a raking transmission spline sleeve or a raking clutch or the like.

The raking mechanism includes a raking clutch and the like, the raking clutch is arranged on the raking rotating component or the power shaft section or the raking transmission component or the like, and the non-concentric connected retaining sleeve is arranged between the eccentric shaft section bearing and the power shaft section raking clutch; when the raking arm needs to rotate for raking, the raking clutch drives the raking rotating component to drive the raking arm to rotate; during reciprocating impact discharge, the raking clutch enables the raking arm to stop rotating, thus preventing the raking arm from hindering the impact discharge; and the raking transmission component and the raking rotating component are separated or integrated or connected in other manners.

The case is provided with a rotating arm drop limiting mechanism and the like; the rotating arm drop limiting mechanism includes a supporting claw, a fixed shaft, a limiting block and the like; the limiting block includes an upper limiting block, a lower limiting block and the like; the supporting claw swings between the upper limiting block and the lower limiting block, the limiting block and the case are separately connected or integrated or connected in other manners, the fixed shaft is arranged on the case, the supporting claw is articulated with the fixed shaft, and the limiting block limits the supporting claw such that the supporting claw works or stops or stay at other states; when the raking arm rotates for raking, the raking arm supports the supporting claw for a certain angle and then smoothly rotates for raking via the rotating space of the supporting claw; and when the raking arm moves reversely, the supporting claw supports the raking arm under the action of the limiting block, such that the raking arm stops.

The power shaft section is provided with an oil throwing power component and the like; an oil throwing mechanism and the like are arranged in the case; the oil throwing mechanism includes an oil throwing shaft, an oil thrower and the like; the oil throwing power component drives the oil throwing shaft, the oil throwing shaft drives the oil thrower to rotate for throwing oil, the oil throwing shaft is arranged at the lower part of the case to increase the oil throwing quantity, and the oil throwing power component is a sprocket chain oil throwing power component or a belt pulley oil throwing power component or a gear rack oil throwing power component or a pin tooth type oil throwing power component or a rope and rope winder oil throwing power component or a gear oil throwing power component or a hanging tooth oil throwing power component or the like.

One or more eccentric shaft sections are adopted, more than two eccentric shaft sections are arranged in the same direction or arranged at equal intervals in the radial direction of the power shaft sections or arranged with angle differences formed in the radial direction of the power shaft sections.

The eccentric shaft sections include a middle eccentric shaft section, a left eccentric shaft section, a right eccentric shaft section and the like; the diameter of the middle eccentric shaft section is greater than that of the left eccentric shaft section or the right eccentric shaft section; the eccentric shaft section bearings include a middle eccentric shaft section bearing, a left eccentric shaft section bearing and a right eccentric shaft section bearing; the whole middle eccentric shaft section bearing penetrates through the left eccentric shaft section or the right eccentric shaft section and is fixed on the middle eccentric shaft section, or the middle eccentric shaft section bearing is a separate one.

The non-concentric protruding shaft fixed bearing reciprocating impact part further includes a driving transmission component and the like, and the driving transmission component is arranged on the power shaft section or between the power shaft section and the eccentric shaft section or between the eccentric shaft sections or arranged in other manners.

The present invention further includes a reciprocating impact part non-concentric protruding shaft fixed bearing method, including the following steps:

1, arranging eccentric shaft sections, power shaft sections and the like, arranging eccentric shaft section bearings and the like on the eccentric shaft sections, and arranging power shaft section bearings and the like on the power shaft sections;

2, arranging power shaft section bearing retaining rings, eccentric shaft section bearing retaining rings and the like, such that the power shaft section bearing retaining rings and the eccentric shaft section bearing retaining rings respectively block the power shaft section bearings and the eccentric shaft section bearings, or the power shaft section bearing retaining rings, the eccentric shaft section bearing retaining rings and the like are made into integrated non-concentric connected retaining sleeves, the external diameters of the power shaft section bearing retaining rings of the non-concentric connected retaining sleeves are smaller than the internal diameters of power shaft section bearing outer supporting rings, the external diameters of the eccentric shaft section bearing retaining rings are smaller than the internal diameters of eccentric shaft section bearing outer supporting rings, the power shaft section bearing retaining rings and the eccentric shaft section bearing retaining rings form height differences, and the spaces of the height differences avoid friction between the rotating eccentric shaft section bearing retaining rings and the power shaft section bearing outer supporting rings and/or avoid friction between the rotating power shaft section bearing retaining rings and the eccentric shaft section bearing outer supporting rings; arranging blocking sleeve rotating prevention components and the like on the non-concentric connected retaining sleeves and the eccentric shaft sections and/or the non-concentric connected retaining sleeves and the power shaft sections, such that the blocking sleeve rotating prevention components prevent the non-concentric connected retaining sleeves from rotating relative to the power shaft sections and the eccentric shaft sections; arranging the non-concentric connected retaining sleeves between the power shaft section bearings and the eccentric shaft section bearings or between the eccentric shaft section bearings or between the eccentric shaft section bearings and power shaft section raking clutches or in other manners;

3, arranging connecting rods and the like, arranging the connecting rods as separate snap-fitted crankshaft connecting rods or integrated sleeved crankshaft connecting rods or the like, and sleeving the integrated sleeved crankshaft connecting rods onto the eccentric shaft section bearings;

4, arranging a case and the like, and arranging the power shaft section bearings and the like on the case, such that the power shaft section bearings support the power shaft sections, the eccentric shaft sections and the like; and 5, arranging a power source component and the like, such that the power source component drives the power shaft sections and the like to rotate, and the power shaft sections drive the connecting rods and the like in reciprocating impact.

The non-concentric protruding shaft fixed bearing reciprocating impact part for implementing the reciprocating impact part non-concentric protruding shaft fixed bearing method in the present invention has the following advantages:

1. The eccentric shaft section bearings are arranged on the eccentric shaft sections, the power shaft section bearings are arranged on the power shaft sections, the power shaft section bearing retaining rings and the eccentric shaft section bearing retaining rings respectively block the power shaft section bearings and the eccentric shaft section bearings, or the power shaft section bearing retaining rings and the eccentric shaft section bearing retaining rings are made into integrated non-concentric connected retaining sleeves, the external diameters of the power shaft section bearing retaining rings of the non-concentric connected retaining sleeves are smaller than the internal diameters of power shaft section bearing outer supporting rings, the external diameters of the eccentric shaft section bearing retaining rings are smaller than the internal diameters of eccentric shaft section bearing outer supporting rings, the power shaft section bearing retaining rings and the eccentric shaft section bearing retaining rings form height differences, the spaces of the height differences avoid friction between the rotating eccentric shaft section bearing retaining rings and the power shaft section bearing outer supporting rings and/or avoid friction between the rotating power shaft section bearing retaining rings and the eccentric shaft section bearing outer supporting rings, blocking sleeve rotating prevention components are arranged on the non-concentric connected retaining sleeves and the eccentric shaft sections and/or the non-concentric connected retaining sleeves and the power shaft sections, the blocking sleeve rotating prevention components prevent the non-concentric connected retaining sleeves from rotating relative to the power shaft sections and the eccentric shaft sections, the non-concentric connected retaining sleeves are arranged between the power shaft section bearings and the eccentric shaft section bearings or between the eccentric shaft section bearings or between the eccentric shaft section bearings and power shaft section clutches, the integrated sleeved crankshaft connecting rods are sleeved onto the eccentric shaft section bearings, the power shaft section bearings are arranged on the case, the power shaft section bearings support the power shaft sections and the eccentric shaft sections, the power source component drives the power shaft sections to rotate, the power shaft sections drive the connecting rods in reciprocating impact, the non-concentric connected retaining sleeves arranged between the power shaft section bearings and the eccentric shaft section bearings block the power shaft section bearings, the eccentric shaft section bearings and the like from shifting, and the power shaft section bearing retaining rings and the eccentric shaft section bearing retaining rings form the integrated non-concentric connected retaining sleeves, so that the size and the strength of the non-concentric connected retaining sleeves are increased, the capabilities of impact resistance, vibration resistance and the like of the non-concentric connected retaining sleeves are greatly improved, the service life of equipment is prolonged, and the maintenance is reduced.

2. The circle section center of the eccentric shaft section and the circle section center of the power shaft section are arranged in such a way: the circle section of the power shaft section is arranged within the circle section of the eccentric shaft section, the distance between the circle section center of the power shaft section and the circle section center of the eccentric shaft section is half of a reciprocating impact stroke, an eccentric shaft section integrated bearing is integrally installed on the eccentric shaft section, and the non-concentric connected retaining sleeve is arranged between the power shaft section bearing and the eccentric shaft section bearing to block the power shaft section bearing and the eccentric shaft section bearing from shifting; the eccentric shaft section integrated bearing needs to be integrally installed on the eccentric shaft section, the connecting rod needs to be integrally sleeved on the eccentric shaft section integrated bearing, then the diameter of the eccentric shaft section must be greater than that of the power shaft section, and the size and the strength of the eccentric shaft section are thus greatly increased; meanwhile, due to the increase of the eccentric shaft section, the size and the strength of the eccentric shaft section integrated bearing are also increased, and the size and the strength of the crankshaft connecting rod are increased; the power shaft section and the eccentric shaft section are integrated, such that the strength of a non-concentric protruding shaft is further improved; compared with the mode that a separate connecting rod is snap-fitted onto a separate bearing, the mode that the whole connecting rod is sleeved on the eccentric shaft section integrated bearing improves the bearing capacity and the fitting precision of all components.

3. The eccentric shaft section is provided with an anti-rotating hole or an anti-rotating groove, the non-concentric connected retaining sleeve is provided with a boss matched with the anti-rotating hole or the anti-rotating groove, and the boss is matched with the anti-rotating hole or the anti-rotating groove to prevent the non-concentric connected retaining sleeve from rotating relative to the eccentric shaft section; the eccentric shaft section and the non-concentric connected retaining sleeve are mutually limited by their own structures, such that the non-concentric connected retaining sleeve is prevented from rotating relative to the eccentric shaft section, anti-rotating pins and the like are saved, and component loss and component damage of equipment are reduced.

4. An anti-rotating key is arranged in the internal diameter of the non-concentric connected retaining sleeve, the power shaft section and/or the eccentric shaft section are correspondingly provided with a key groove, and the anti-rotating key is pushed into the key groove to prevent rotating, or both the non-concentric connected retaining sleeve and the power shaft section are provided with the key groove, the anti-rotating key is respectively arranged in the key grooves of the non-concentric connected retaining sleeve and the power shaft section, and the anti-rotating key is matched with the key groove to prevent the non-concentric connected retaining sleeve from rotating relative to the power shaft section.

5. The eccentric shaft section and/or the non-concentric connected retaining sleeve are provided with a pin hole, the anti-rotating pin is arranged in the pin hole to prevent the non-concentric connected retaining sleeve from rotating relative to the eccentric shaft section, the eccentric shaft section is provided with a blind hole, the non-concentric connected retaining sleeve is provided with a through hole, the anti-rotating pin penetrates through the through hole of the non-concentric connected retaining sleeve, one end of the anti-rotating pin is arranged in the blind hole of the eccentric shaft section while the other end is arranged in the through hole of the non-concentric connected retaining sleeve, and the anti-rotating pin is prevented from dropping from the through hole of the non-concentric connected retaining sleeve by spot welding or gluing, such that the anti-rotating pin can be conveniently installed and positioned quickly, or both the eccentric shaft section and the non-concentric connected retaining sleeve are provided with the blind hole, one end of the anti-rotating pin is arranged in the blind hole of the non-concentric connected retaining sleeve while the other end is arranged in the blind hole of the eccentric shaft section, and the blind holes prevent the anti-rotating pin from dropping.

6. A retaining shoulder is formed on one side of the eccentric shaft section, while the non-concentric connected retaining sleeve is arranged on the other side, the retaining shoulder and the non-concentric connected retaining sleeve jointly prevent the eccentric shaft section bearing from shifting in the axial direction of the eccentric shaft section, and the internal diameter of the non-concentric connected retaining sleeve is snap-fitted with the power shaft section in radial positioning, such that axial positioning and radial positioning of the non-concentric connected retaining sleeve, the eccentric shaft section bearing and the power shaft section bearing are realized.

7. The non-concentric connected retaining sleeve is provided with a detaching jackscrew hole and/or the eccentric shaft section or the power shaft section is provided with a hoisting hole, such that the non-concentric connected retaining sleeve is conveniently detached from the eccentric shaft section via the jackscrew hole; the eccentric shaft section is provided with the hoisting hole, thus solving the problems that a non-concentric protruding shaft which is too large and too heavy is difficult to carry manually, assemble, detach for maintenance and the like, and improving the working efficiency.

8. The raking transmission component is arranged inside or outside the case, the raking transmission component drives the raking rotating component to rotate, the raking rotating component drives the raking arm to rotate, the raking transmission sprocket or raking transmission gear or raking transmission belt pulley or raking transmission frictional wheel or raking transmission coupling or raking clutch drives the raking rotating component to rotate, and the raking transmission component is arranged on the power shaft section, such that a special power source component for the raking transmission component is saved; the raking rotating component drives the raking arm to rotate, the raking transmission component is separately connected or integrated with the raking rotating component, and the raking rotating component is separately connected or integrated with the raking arm, such that the components of equipment are used together, and then the equipment is simple in structure and reliable in working performance.

9. The raking clutch is arranged on the raking rotating component or the power shaft section or the raking transmission component, and the non-concentric connected retaining sleeve is arranged between the eccentric shaft section bearing and the power shaft section raking clutch; when the raking arm needs to rotate for raking, the raking clutch drives the raking rotating component to drive the raking arm to rotate; during reciprocating impact discharge, the raking clutch enables the raking arm to stop rotating, thus preventing the raking arm from hindering the impact discharge, solving the problems that lifting of a rocker arm is influenced because the reciprocating impact discharge is hindered by rotation of the raking rotating arm during the reciprocating impact discharge and the like, and realizing skilful structure and strong practicability.

10. The supporting claw swings between the upper limiting block and the lower limiting block, the limiting block is separately connected or integrated with the case, the fixed shaft is arranged on the case, the supporting claw is articulated with the fixed shaft, and the limiting block limits the supporting claw, such that the supporting claw works or stops; when the raking arm rotates for raking, the raking arm supports the supporting claw for a certain angle and then smoothly rotates for raking via the rotating space of the supporting claw; and when the raking arm moves reversely, the supporting claw supports the raking arm under the action of the limiting block, such that the raking arm stops.

11. The power shaft section is provided with an oil throwing power component, an oil throwing mechanism is arranged in the case, the oil throwing power component drives the oil throwing shaft, the oil throwing shaft drives the oil thrower to rotate for throwing oil, and the oil throwing shaft is arranged at the lower part of the case to increase the oil throwing quantity; the problems that the non-concentric protruding shaft needs to be lubricated and cooled and the like are solved by sufficiently using the power on the power shaft section, such that eccentric shaft section bearings, power shaft section bearings and the like are well lubricated, and the service life of equipment is prolonged.

12. More than two eccentric shaft sections are arranged at equal intervals in the radial direction of the power shaft sections, such that the excavation efficiency of equipment is improved, the non-concentric protruding shaft is stressed uniformly, and the equipment is long in service life and reliable in work.

13. The diameter of the middle eccentric shaft section is greater than that of the left eccentric shaft section or the right eccentric shaft section, the whole middle eccentric shaft section bearing penetrates through the left eccentric shaft section or the right eccentric shaft section and is fixed on the middle eccentric shaft section, or the middle eccentric shaft section bearing is a separate one, and the middle eccentric shaft section bearing increases the reciprocating impact excavation discharge width.

14. The driving transmission component is arranged on the power shaft section or between the power shaft section and the eccentric shaft section or between the eccentric shaft sections, such that the driving transmission component of the non-concentric protruding shaft is beneficial to receiving power transmitted by the power source component from multiple positions and multiple angles.

15. The blocking sleeve rotating prevention component prevents the non-concentric connected retaining sleeve from rotating relative to the eccentric shaft section, such that the non-concentric connected retaining sleeve is static relative to the power shaft section bearing and the eccentric shaft section bearing, relative running wear is eliminated, and the power shaft section bearing and the eccentric shaft section bearing are permanently and accurately positioned and blocked from shifting.

16. Two sides of the non-concentric connected retaining sleeve are parallel, such that the power shaft section bearing and the eccentric shaft section bearing are positioned accurately in the radial direction, the running stability of an eccentric shaft section bearing connecting rod driving device is improved, and the service lives of the bearings are prolonged.

LIST OF REFERENCE SIGNS IN FIGURES

In the figures: 1, case; 2, connecting rod; 3, power source component; 4, separate snap-fitted crankshaft connecting rod; 5, power shaft section bearing; 6, blocking sleeve rotating prevention component; 7, non-concentric connected retaining sleeve; 8, eccentric shaft section bearing; 9, eccentric shaft section bearing retaining ring; 10, power shaft section bearing retaining ring; 11, power shaft section; 12, eccentric shaft section; 13, internal diameters of power shaft section bearing outer supporting rings; 14, internal diameters of eccentric shaft section bearing outer supporting rings; 15, external diameters of eccentric shaft section bearing retaining rings; 16, external diameters of power shaft section bearing retaining rings; 17, circle section center of the power shaft section; 18, circle section center of the eccentric shaft section; 19, circle section of the power shaft section; 20, circle section of the eccentric shaft section; 21, retaining shoulder; 22, anti-rotating hole; 23, boss; 24, blind hole; 25, anti-rotating pin; 26, detaching jackscrew hole; 27, key groove; 28, anti-rotating key; 29, hoisting hole; 30, raking mechanism; 31, raking transmission component; 32, raking rotating component; 33, raking arm; 34, raking transmission gear; 35, raking transmission sprocket; 36, raking clutch; 37, rotating arm drop limiting mechanism; 38, supporting claw; 39, fixed shaft; 40, limiting block; 41, upper limiting block; 42, lower limiting block; 43, oil throwing mechanism; 44, oil thrower; 45, oil throwing shaft; 46, oil throwing power component; 47, sprocket chain oil throwing power component; 48, middle eccentric shaft section bearing; 49, middle eccentric shaft section; 50, right eccentric shaft section bearing; 51, left eccentric shaft section bearing; 52, left eccentric shaft section; 53, right eccentric shaft section; 54, driving transmission component.

DETAILED DESCRIPTION OF THE EMBODIMENTS

The present invention will be further described below in combination with the accompanying drawings.

Embodiment 1

Figure 1:
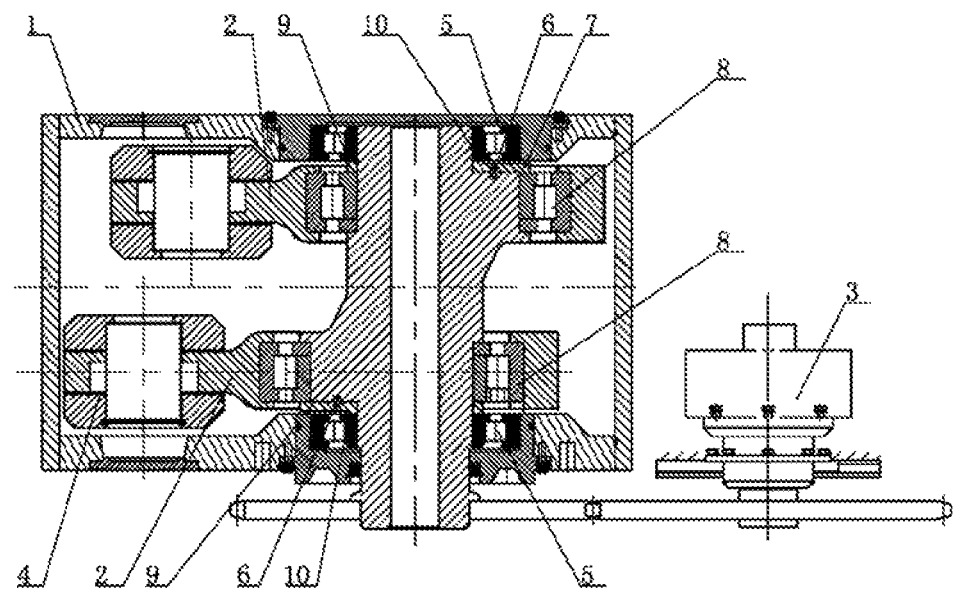
FIG. 1 is a structural schematic diagram of a non-concentric protruding shaft fixed bearing reciprocating impact part in embodiment 1.
Figure 2:
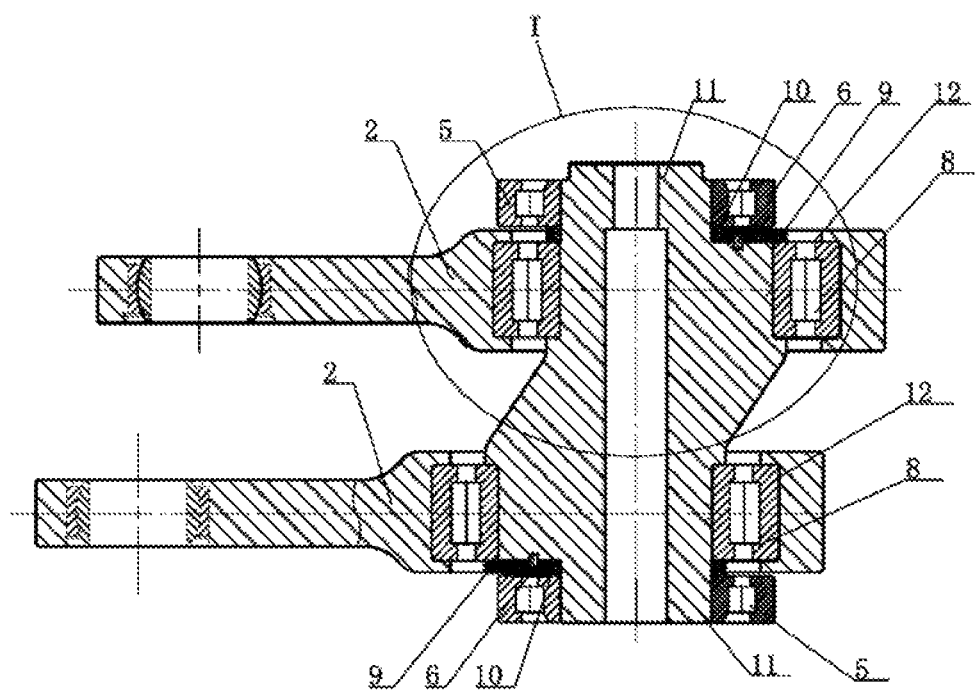
FIG. 2 is a second structural schematic diagram of the non-concentric protruding shaft fixed bearing reciprocating impact part in embodiment 1.
Figure 3:
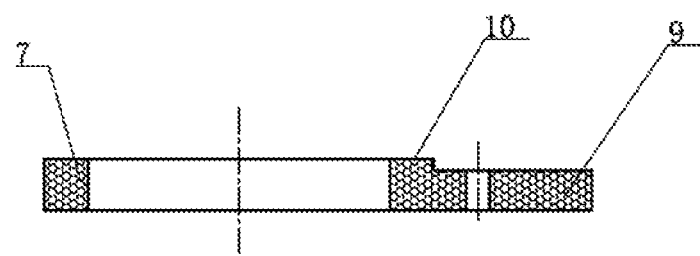
FIG. 3 is a structural schematic diagram of a non-concentric connected retaining sleeve in embodiment 1.
Figure 4:
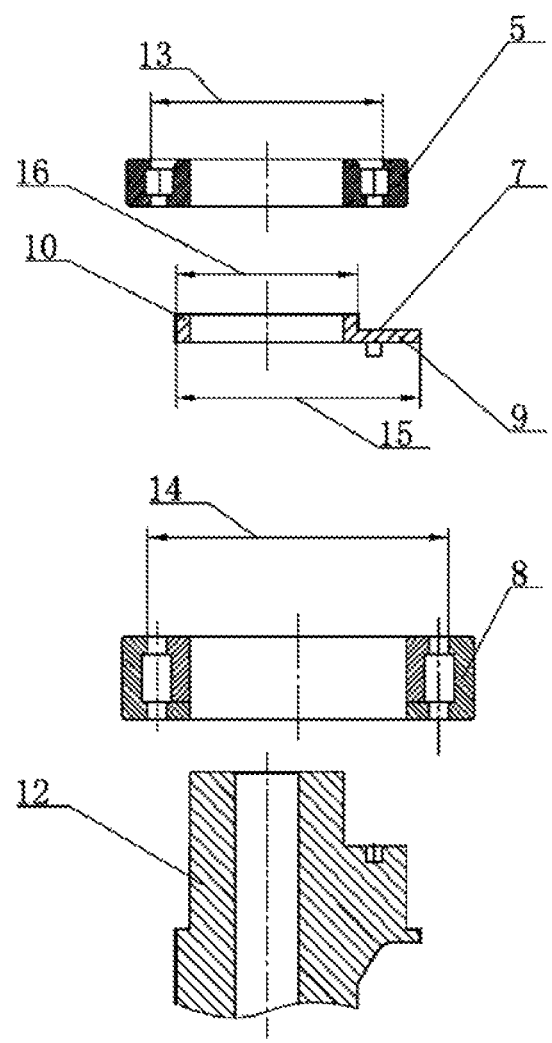
FIG. 4 is a third structural schematic diagram of the non-concentric protruding shaft fixed bearing reciprocating impact part in embodiment 1.
Figure 5:
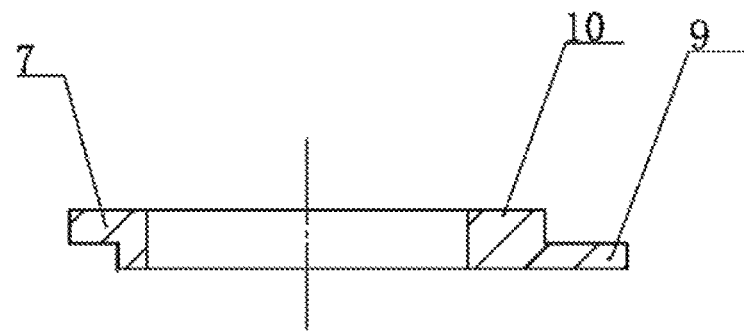
FIG. 5 is a second structural schematic diagram of the non-concentric connected retaining sleeve in embodiment 1.
Figure 6:
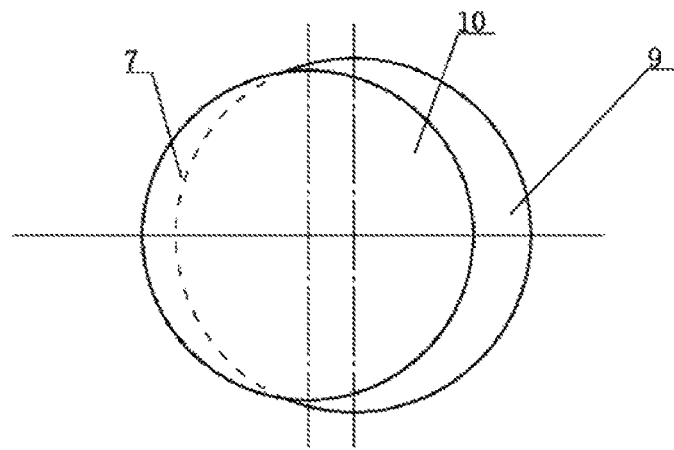
FIG. 6 is a third structural schematic diagram of the non-concentric connected retaining sleeve in embodiment 1.
Figure 7:
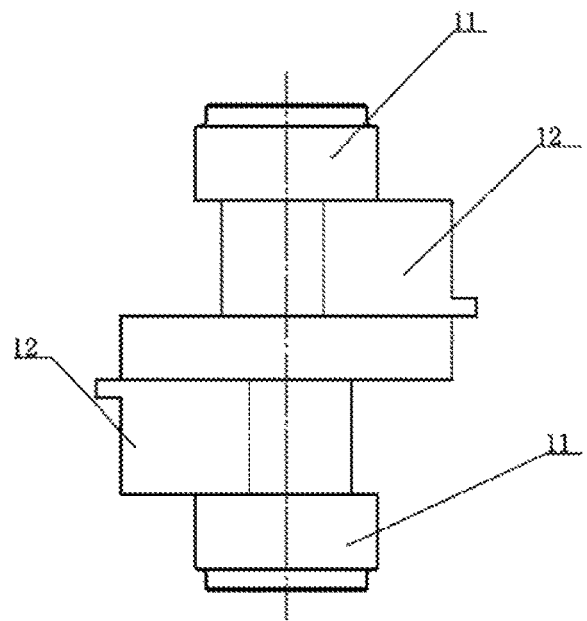
FIG. 7 is a structural schematic diagram of a power shaft section and an eccentric shaft section in embodiment 1.

FIG. 1 to FIG. 7 show a reciprocating impact part non-concentric protruding shaft fixed bearing method and a non-concentric protruding shaft fixed bearing reciprocating impact part for implementing the method in embodiment 1. The non-concentric protruding shaft fixed bearing reciprocating impact part includes power shaft sections 11, eccentric shaft sections 12, power shaft section bearings 5, eccentric shaft section bearings 8, power shaft section bearing retaining rings 10, eccentric shaft section bearing retaining rings 9, connecting rods 2, a power source component 3, a case 1 and the like, wherein the power shaft sections 11 and the eccentric shaft sections 12 form an integrated structure, the eccentric shaft section bearings 8 and the like are arranged on the eccentric shaft sections 12, the power shaft section bearings 5 and the like are arranged on the power shaft sections 11, the eccentric shaft section bearings 8 are eccentric shaft section separate bearings or eccentric shaft section integrated bearings or the like, the power shaft section bearing retaining rings 10 and the eccentric shaft section bearing 8 retaining rings 9 respectively block the power shaft section bearings 5, the eccentric shaft section bearings 8 and the like, the power shaft section bearings 5 and the eccentric shaft section bearings 8 may also be positioned and fixed by non-concentric connected retaining sleeves 7 integrating the power shaft section bearing retaining rings 10 with the eccentric shaft section bearing retaining rings 9 to prevent axial movement, the external diameters of the power shaft section bearing retaining rings 10 of the non-concentric connected retaining sleeves 7 are smaller than the internal diameters of power shaft section bearing outer supporting rings 13, the external diameters of the eccentric shaft section bearing retaining rings 15 are smaller than the internal diameters of eccentric shaft section bearing outer supporting rings 14, the power shaft section bearing retaining rings 10 and the eccentric shaft section bearing retaining rings 9 form height differences, the spaces of the height differences avoid friction between the rotating eccentric shaft section bearing retaining rings 9 and the power shaft section bearing outer supporting rings and/or avoid friction between the rotating power shaft section bearing retaining rings 10 and the eccentric shaft section bearing outer supporting rings and the like, as shown in FIG. 1, the non-concentric connected retaining sleeves 7 are arranged between the power shaft section bearings 5 and the eccentric shaft section bearings 8 and may also be arranged between the eccentric shaft section bearings 8 to prevent the two eccentric shaft section bearings 8 from approaching and rubbing, blocking sleeve rotating prevention components 6 are arranged on the non-concentric connected retaining sleeves 7 and the eccentric shaft sections 12 and/or the non-concentric connected retaining sleeves 7 and the power shaft sections 11, the blocking sleeve rotating prevention components 6 prevent the non-concentric connected retaining sleeves 7 from rotating relative to the power shaft sections 11, the eccentric shaft sections 12 and the like, each connecting rod 2 includes a separate snap-fitted crankshaft connecting rod 4 or an integrated sleeved crankshaft connecting rod, the integrated sleeved crankshaft connecting rods are sleeved onto the eccentric shaft section bearings 8, the power shaft section bearings 5 are arranged on one side or two sides of the case 1 to support the power shaft sections 11, the power shaft section bearings 5 support the power shaft sections 11, the eccentric shaft sections 12 and the like to rotate, and the power source drives the power shaft sections 11 to drive the connecting rods 2 in reciprocating impact.

Each power shaft section bearing retaining ring 10 includes a clamping spring or a spacer bushing, the clamping springs or the spacer bushings fix the relative positions of the power shaft sections 11 and the power shaft section bearings 5, and one or more eccentric shaft sections 12 and the like are adopted. More than two eccentric shaft sections 12 are arranged in the same direction or arranged at equal intervals in the radial direction of the power shaft sections 11 or arranged with angle differences formed in the radial direction of the power shaft sections 11 or arranged in other manners.

The power shaft sections 11 may also be separately connected with the eccentric shaft sections 12.

The connecting rods 2 may also be separate snap-fitted crankshaft connecting rods 4 and the like.

The present invention further provides a method for installing overall bearings on eccentric shaft sections at a reciprocating impact part, which is characterized by including:

1, arranging eccentric shaft sections 12, power shaft sections 11 and the like, arranging eccentric shaft section bearings 8 and the like on the eccentric shaft sections 12, and arranging power shaft section bearings 5 and the like on the power shaft sections 11;

2, arranging power shaft section bearing retaining rings 10, eccentric shaft section bearing retaining rings 9 and the like, such that the power shaft section bearing retaining rings 10 and the eccentric shaft section bearing retaining rings 9 respectively block the power shaft section bearings 5, the eccentric shaft section bearings 8 and the like, or the power shaft section bearing retaining rings 10 and the eccentric shaft section bearing retaining rings 9 are made into integrated non-concentric connected retaining sleeves 7 and the like, the external diameters of the power shaft section bearing retaining rings 10 of the non-concentric connected retaining sleeves are smaller than the internal diameters of power shaft section bearing outer supporting rings 13 and the like, the external diameters of the eccentric shaft section bearing retaining rings 15 are smaller than the internal diameters of eccentric shaft section bearing outer supporting rings 14, the power shaft section bearing retaining rings 10 and the eccentric shaft section bearing retaining rings 9 form height differences, and the spaces of the height differences avoid friction between the rotating eccentric shaft section bearing retaining rings 9 and the power shaft section bearing outer supporting rings and/or avoid friction between the rotating power shaft section bearing retaining rings 10 and the eccentric shaft section bearing outer supporting rings; arranging blocking sleeve rotating prevention components 6 and the like on the non-concentric connected retaining sleeves 7 and the eccentric shaft sections 12 and/or the non-concentric connected retaining sleeves 7 and the power shaft sections 11, such that the blocking sleeve rotating prevention components 6 prevent the non-concentric connected retaining sleeves 7 and the like from rotating relative to the power shaft sections 11 and the eccentric shaft sections 12; arranging the non-concentric connected retaining sleeves 7 and the like between the power shaft section bearings 5 and the eccentric shaft section bearings 8 or between the eccentric shaft section bearings 8 or between the eccentric shaft section bearings 8 and power shaft section raking clutches;

3, arranging connecting rods 2 and the like, arranging the connecting rods 2 as separate snap-fitted crankshaft connecting rods 4 or integrated sleeved crankshaft connecting rods or the like, and sleeving the integrated sleeved crankshaft connecting rods onto the eccentric shaft section bearings 8;

4, arranging a case 1 and the like, and arranging the power shaft section bearings 5 and the like on the case 1, such that the power shaft section bearings 5 support the power shaft sections 11, the eccentric shaft sections 12 and the like; and 5, arranging a power source component 3 and the like, such that the power source component 3 drives the power shaft sections 11 and the like to rotate, and the power shaft sections 11 drive the connecting rods 2 in reciprocating impact.

The non-concentric connected retaining sleeves and the like arranged between the power shaft section bearings and the eccentric shaft section bearings block the power shaft section bearings and the eccentric shaft section bearings from shifting, and the power shaft section bearing retaining rings and the eccentric shaft section bearing retaining rings form the integrated non-concentric connected retaining sleeves, so that the size and the strength of the non-concentric connected retaining sleeves are increased, the capabilities of impact resistance, vibration resistance and the like of the non-concentric connected retaining sleeves are greatly improved, the service life of equipment is prolonged, and the maintenance is reduced.

Embodiment 2

Figure 8:
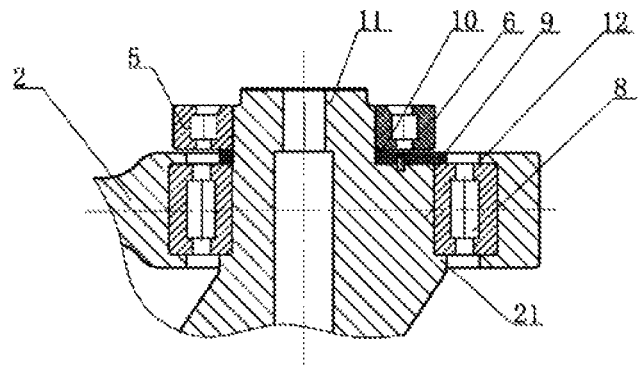
FIG. 8 is an enlarged structural schematic diagram of I in FIG. 2.
Figure 9:
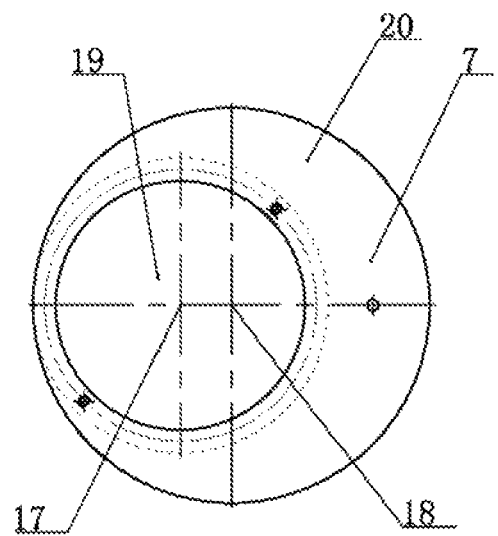
FIG. 9 is a structural schematic diagram of a non-concentric connected retaining sleeve in embodiment 2.
Figure 10:
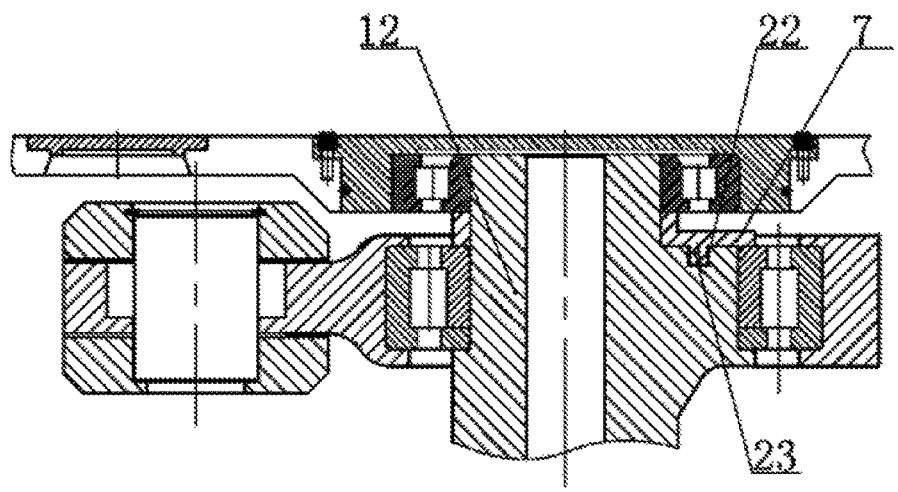
FIG. 10 is a schematic diagram of an installation structure of a non-concentric connected retaining sleeve in embodiment 3.

As shown in FIG. 8 and FIG. 9, they show a reciprocating impact part non-concentric protruding shaft fixed bearing method and a non-concentric protruding shaft fixed bearing reciprocating impact part for implementing the method in embodiment 2. The circle section center of the eccentric shaft section 18 and the circle section center of the power shaft section 17 are arranged in such a way: the circle section of the power shaft section 19 is arranged within the circle section of the eccentric shaft section 20, the distance between the circle section center of the power shaft section 17 and the circle section center of the eccentric shaft section 18 is half of a reciprocating impact stroke, an eccentric shaft section integrated bearing is integrally installed on the eccentric shaft section 12, the power shaft section 11 is connected with the eccentric shaft section 12 separately or integrally, the non-concentric connected retaining sleeve 7 is arranged between the power shaft section bearing 5 and the eccentric shaft section bearing 8 to block the power shaft section bearing 5, the eccentric shaft section bearing 8 and the like from shifting, a retaining shoulder 21 and the like are formed on one side of the eccentric shaft section 12, while the non-concentric connected retaining sleeve 7 or a clamping spring or a retaining ring or the like is arranged on the other side of the eccentric shaft section 12.

The eccentric shaft section integrated bearing needs to be integrally installed on the eccentric shaft section, the connecting rod needs to be integrally sleeved on the eccentric shaft section integrated bearing, then the diameter of the eccentric shaft section must be greater than that of the power shaft section, and the size and the strength of the eccentric shaft section are thus greatly increased; meanwhile, due to the increase of the eccentric shaft section, the size and the strength of the eccentric shaft section integrated bearing are also increased, the size and the strength of the crankshaft connecting rod are increased, the power shaft section and the eccentric shaft section are integrated, and the strength of a non-concentric protruding shaft is further improved.

The rest is the same as embodiment 1.

Embodiment 3

As shown in FIG. 10 to FIG. 13, they show a reciprocating impact part non-concentric protruding shaft fixed bearing method and a non-concentric protruding shaft fixed bearing reciprocating impact part for implementing the method in embodiment 3. The eccentric shaft section 12 is provided with an anti-rotating hole 22 or an anti-rotating groove or the like, the non-concentric connected retaining sleeve 7 is provided with a boss 23 or the like matched with the anti-rotating hole 22 or the anti-rotating groove, and the boss 23 is matched with the anti-rotating hole 22 or the anti-rotating groove to prevent the non-concentric connected retaining sleeve 7 from rotating relative to the eccentric shaft section 12.

Figure 11:
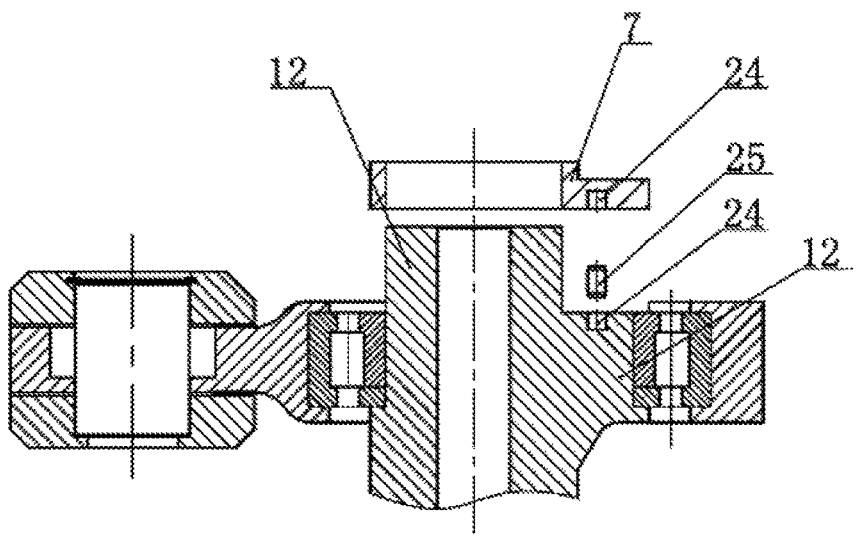
FIG. 11 is a second schematic diagram of an installation structure of the non-concentric connected retaining sleeve in embodiment 3.

The blocking sleeve rotating prevention component 6 includes an anti-rotating pin 25, a pin hole and the like, the eccentric shaft section 12 and/or the non-concentric connected retaining sleeve 7 are provided with pin holes and the like, the pin holes are through holes or blind holes or the like, the anti-rotating pin 25 is arranged in the pin hole to prevent the non-concentric connected retaining sleeve 7 and the like from rotating relative to the eccentric shaft section 12, the blind hole 24 prevents the anti-rotating pin 25 from dropping, the non-concentric connected retaining sleeve 7 is correspondingly provided with a through hole when the eccentric shaft section 12 is provided with the blind hole 24, the anti-rotating pin 25 penetrates through the through hole of the non-concentric connected retaining sleeve and is inserted into the blind hole 24 in the eccentric shaft section 12, one end of the anti-rotating pin 25 is arranged in the blind hole 24 of the eccentric shaft section while the other end is arranged in the through hole of the non-concentric connected retaining sleeve 7, the anti-rotating pin 25 is prevented from dropping from the through hole of the non-concentric connected retaining sleeve 7 by spot welding or gluing, as shown in FIG. 11, or both the eccentric shaft section 12 and the non-concentric connected retaining sleeve 7 are provided with the blind hole 24, one end of the anti-rotating pin 25 is arranged in the blind hole 24 of the non-concentric connected retaining sleeve while the other end is arranged in the blind hole 24 of the eccentric shaft section.

Figure 12:
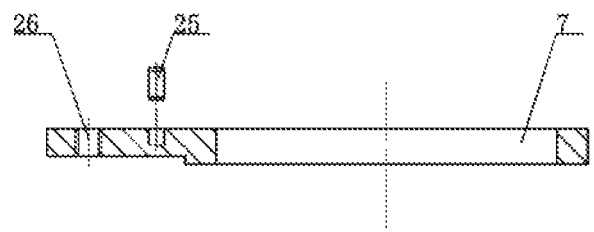
FIG. 12 is a first structural schematic diagram of the non-concentric connected retaining sleeve in embodiment 3.
Figure 13:
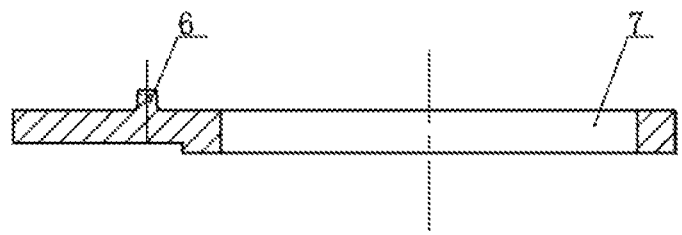
FIG. 13 is a second structural schematic diagram of the non-concentric connected retaining sleeve in embodiment 3.

As shown in FIG. 12, the non-concentric connected retaining sleeve 7 is provided with a detaching jackscrew hole 26, so that the non-concentric connected retaining sleeve 7 can be conveniently detached.

The eccentric shaft section and the non-concentric connected retaining sleeve are mutually limited by their own structures, so that the non-concentric connected retaining sleeve is prevented from rotating relative to the eccentric shaft section, the anti-rotating pin and the like are saved, and component loss and component damage of equipment are reduced.

The rest is the same as embodiment 1.

Embodiment 4

Figure 14:
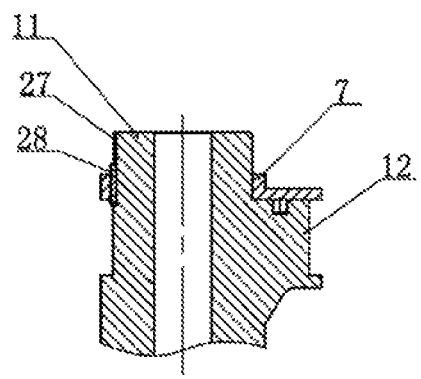
FIG. 14 is a schematic diagram of an installation structure of a non-concentric connected retaining sleeve in embodiment 4.

As shown in FIG. 14, it shows a reciprocating impact part non-concentric protruding shaft fixed bearing method and a non-concentric protruding shaft fixed bearing reciprocating impact part for implementing the method in embodiment 4. An anti-rotating key 28 is arranged in the internal diameter of the non-concentric connected retaining sleeve 7, the power shaft section 11 and/or the eccentric shaft section 12 are correspondingly provided with a key groove 27, and the anti-rotating key 28 is pushed into the key groove 27 to prevent rotating.

Or both the non-concentric connected retaining sleeve 7 and the power shaft section 11 are provided with the key groove 27 and the like, and the anti-rotating key 28 and the like are arranged in the key grooves 27 of the non-concentric connected retaining sleeve 7 and the power shaft section 11.

The anti-rotating key is matched with the key groove to prevent the non-concentric connected retaining sleeve from rotating relative to the power shaft section.

The rest is the same as embodiment 1.

Embodiment 5

Figure 15:
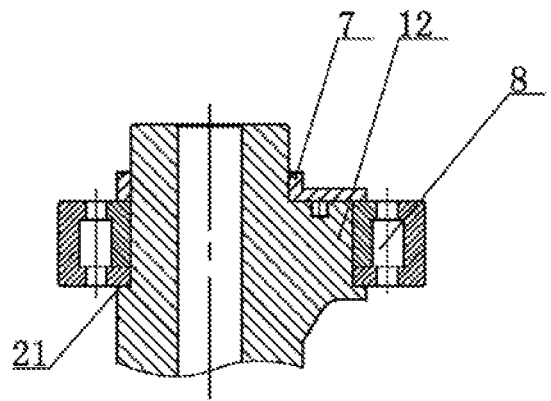
FIG. 15 is a schematic diagram of an installation structure of a non-concentric connected retaining sleeve in embodiment 5.

As shown in FIG. 15, it shows a reciprocating impact part non-concentric protruding shaft fixed bearing method and a non-concentric protruding shaft fixed bearing reciprocating impact part for implementing the method in embodiment 5. A retaining shoulder 21 and the like are formed on one side of the eccentric shaft section 12, while the non-concentric connected retaining sleeve 7 is arranged on the other side, the retaining shoulder 21 and the non-concentric connected retaining sleeve 7 jointly prevent the eccentric shaft section bearing 8 from shifting in the axial direction of the eccentric shaft section 12, and the internal diameter of the non-concentric connected retaining sleeve 7 is snap-fitted with the power shaft section 11 to realize radial positioning.

The rest is the same as embodiment 1.

Embodiment 6

Figure 16:
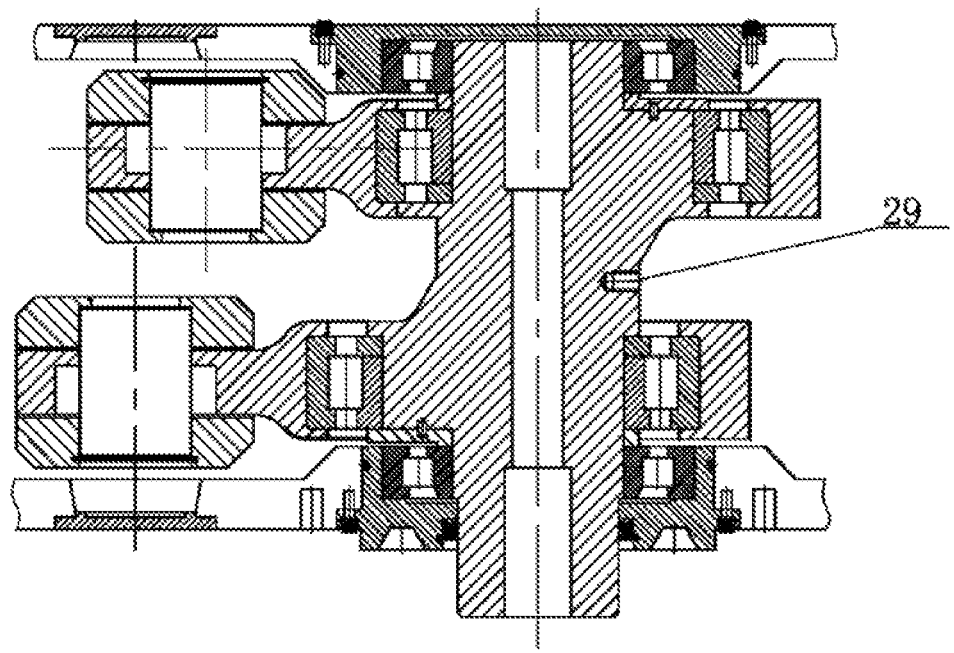
FIG. 16 is a first structural schematic diagram of a non-concentric protruding shaft fixed bearing reciprocating impact part in embodiment 6.
Figure 17:
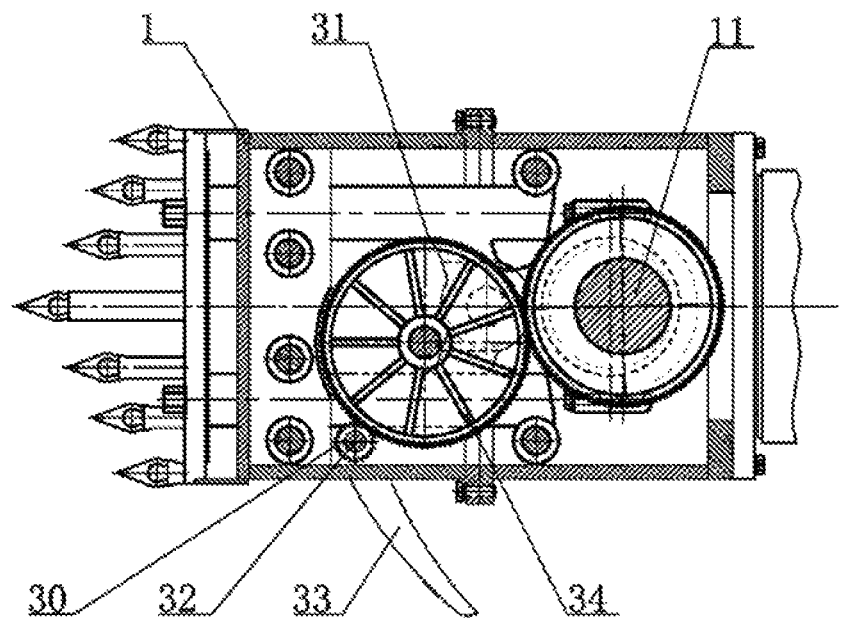
FIG. 17 is a second structural schematic diagram of the non-concentric protruding shaft fixed bearing reciprocating impact part in embodiment 6.
Figure 18:
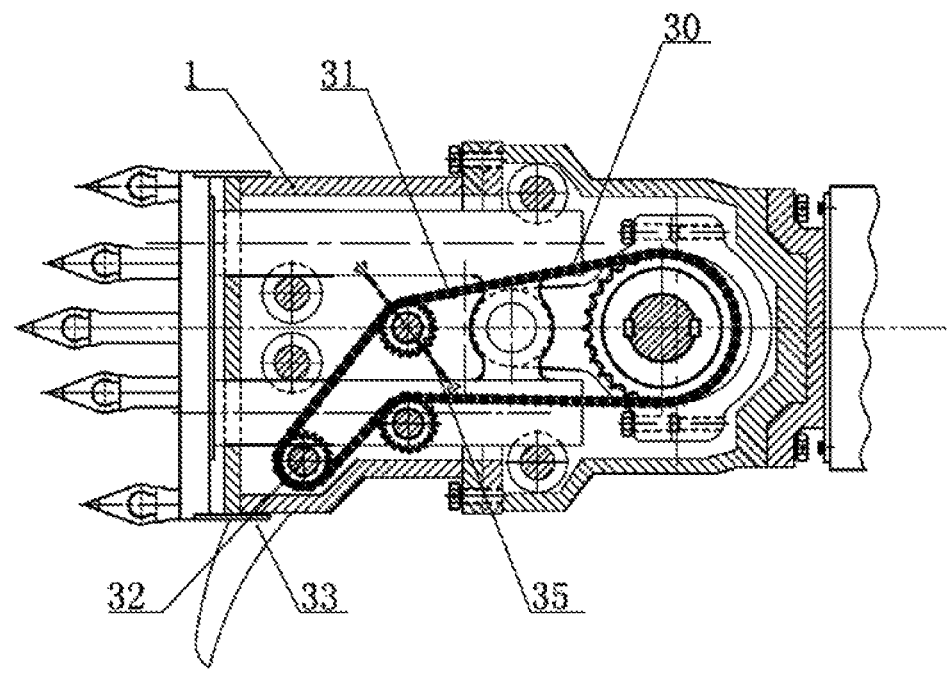
FIG. 18 is a third structural schematic diagram of the non-concentric protruding shaft fixed bearing reciprocating impact part in embodiment 6.
Figure 19:
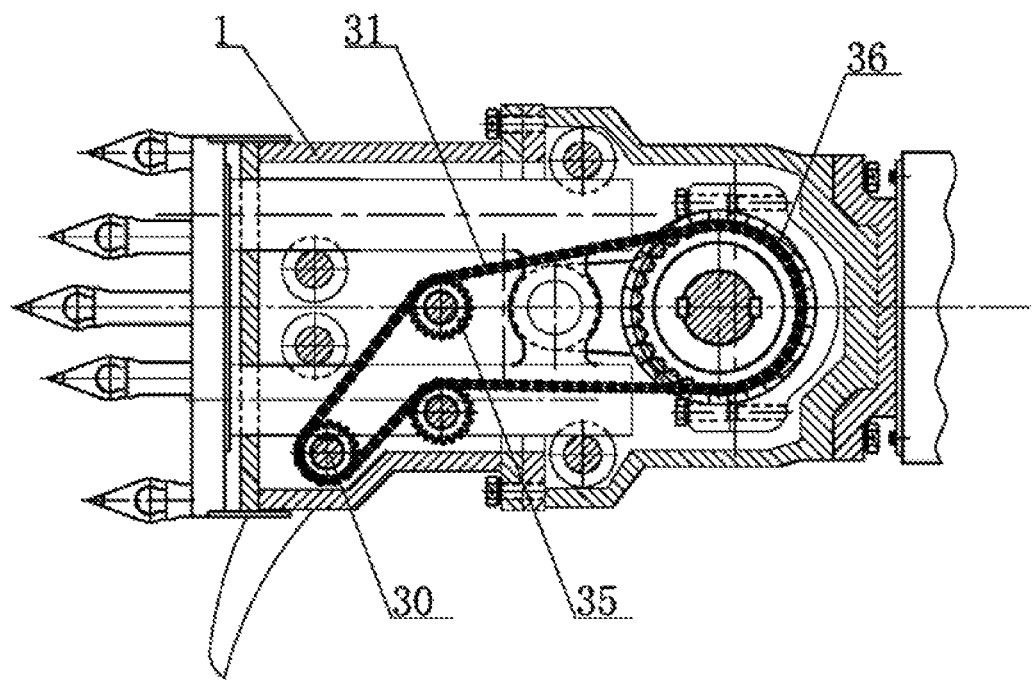
FIG. 19 is a first structural schematic diagram of a non-concentric protruding shaft fixed bearing reciprocating impact part in embodiment 7.

As shown in FIG. 16 to FIG. 18, they show a reciprocating impact part non-concentric protruding shaft fixed bearing method and a non-concentric protruding shaft fixed bearing reciprocating impact part for implementing the method in embodiment 6. As shown in FIG. 16, the eccentric shaft section 12 or the power shaft section 11 is provided with a hoisting hole 29 and the like in order to conveniently move a non-concentric cam shaft.

The non-concentric protruding shaft fixed bearing reciprocating impact part further includes a raking mechanism 30 and the like, the raking mechanism 30 includes a raking transmission component 31 and the like, the raking transmission component 31 and the power shaft section 11 are separated or separately connected or integrated, the raking transmission component 31 is arranged in the case 1, the raking mechanism 30 further includes a raking rotating component 32, a raking arm 33 and the like, the raking transmission component 31 drives the raking rotating component 32 and the like to rotate, and the raking rotating component 32 drives the raking arm 33 and the like to rotate.

As shown in FIG. 17 and FIG. 18, the raking transmission component 31 is a raking transmission sprocket 35 structure or the like, and may also be a raking transmission gear or a raking transmission belt pulley or a raking transmission frictional wheel or a raking transmission coupling or a raking transmission spline sleeve or a raking clutch or the like.

In order to facilitate maintenance, the raking transmission component 31 may also be arranged outside the case 1.

The components of equipment are used together, so that the equipment is simple in structure and reliable in working performance.

The non-concentric connected retaining sleeve is provided with a detaching jackscrew hole and/or the eccentric shaft section or the power shaft section is provided with a hoisting hole and the like, such that the non-concentric connected retaining sleeve is conveniently detached from the eccentric shaft section via the jackscrew hole; the eccentric shaft section is provided with a hoisting hole, thus solving the problems that a non-concentric protruding shaft which is too large and too heavy is difficult to carry manually, assemble, detach for maintenance and the like, and improving the working efficiency.

The rest is the same as embodiment 1.

Embodiment 7

Figure 20:
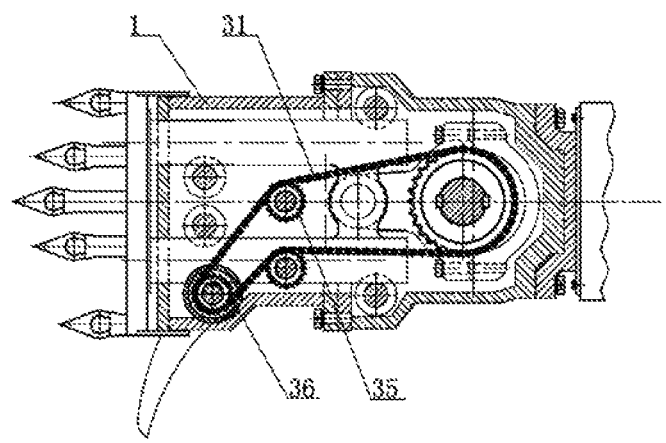
FIG. 20 is a second structural schematic diagram of the non-concentric protruding shaft fixed bearing reciprocating impact part in embodiment 7.
Figure 21:
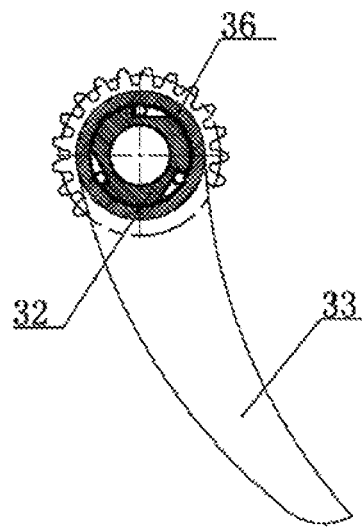
FIG. 21 is a first structural schematic diagram of a raking mechanism in embodiment 7.
Figure 22:
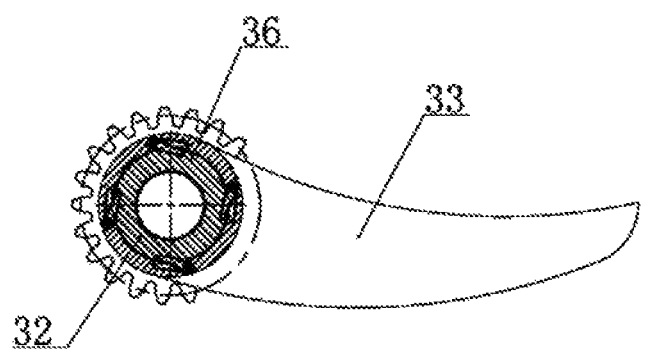
FIG. 22 is a second structural schematic diagram of the raking mechanism in embodiment 7.
Figure 23:
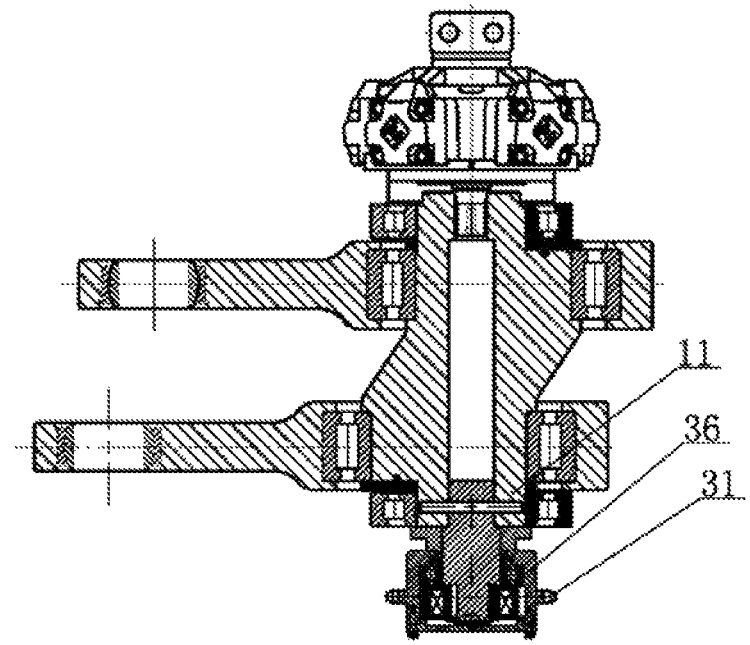
FIG. 23 is a first structural schematic diagram of a raking clutch in embodiment 7.
Figure 24:
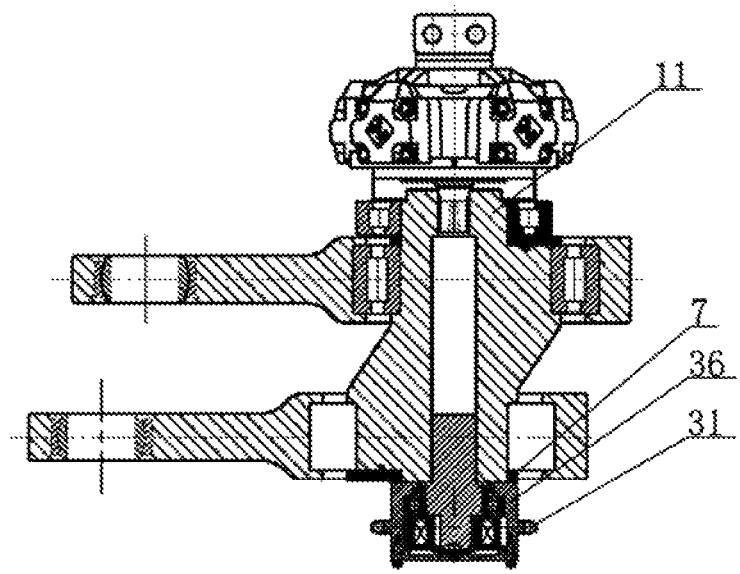
FIG. 24 is a second structural schematic diagram of the raking clutch in embodiment 7.

As shown in FIG. 19 to FIG. 24, they show a reciprocating impact part non-concentric protruding shaft fixed bearing method and a non-concentric protruding shaft fixed bearing reciprocating impact part for implementing the method in embodiment 7. The raking mechanism 30 includes a raking clutch 36 and the like; as shown in FIG. 20 to FIG. 22, the raking clutch 36 is arranged on the raking rotating component 32; as shown in FIG. 23, the raking clutch 36 is arranged on the power shaft section 11; the raking clutch 36 may also be arranged on the raking transmission component 31 or the like. As shown in FIG. 24, the non-concentric connected retaining sleeve 7 is arranged between the eccentric shaft section bearing 8 and the power shaft section raking clutch. When the raking arm 33 needs to rotate for raking, the raking clutch 36 drives the raking rotating component 32 to drive the raking arm 33 to rotate; during reciprocating impact discharge, the raking clutch 36 enables the raking arm 33 to stop rotating, thus preventing the raking arm 33 from hindering the impact discharge; and the raking transmission component 31 is separated from or integrated with the raking rotating component 32.

The problems that lifting of a rocker arm is influenced because the reciprocating impact discharge is hindered by rotation of the raking rotating arm during the reciprocating impact discharge and the like are solved, the structure is skilful, and the practicability is strong.

The rest is the same as embodiment 1.

Embodiment 8

Figure 25:
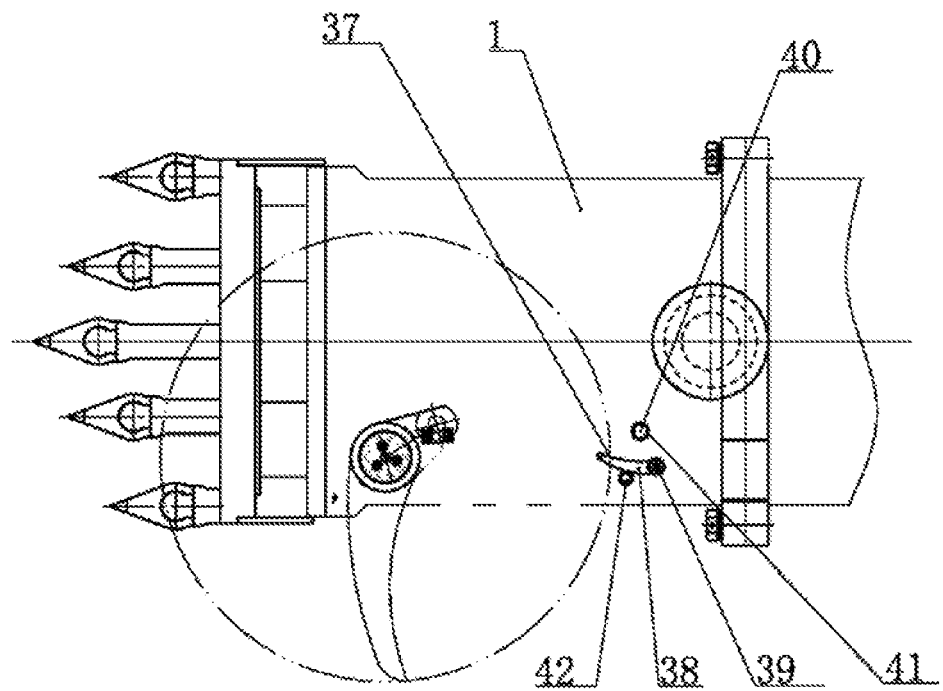
FIG. 25 is a structural schematic diagram of a non-concentric protruding shaft fixed bearing reciprocating impact part in embodiment 8.

As shown in FIG. 25, it shows a reciprocating impact part non-concentric protruding shaft fixed bearing method and a non-concentric protruding shaft fixed bearing reciprocating impact part for implementing the method in embodiment 8. The case 1 is provided with a rotating arm drop limiting mechanism 37 and the like; the rotating arm drop limiting mechanism 37 includes a supporting claw 38, a fixed shaft 39, a limiting block 40 and the like; the limiting block 40 includes an upper limiting block 41, a lower limiting block 42 and the like; the supporting claw 38 swings between the upper limiting block 41 and the lower limiting block 42, the limiting block 40 is separately connected or integrated with the case 1, the fixed shaft 39 is arranged on the case 1, the supporting claw 38 is articulated with the fixed shaft 39, and the limiting block 40 limits the supporting claw 38 such that the supporting claw 38 works or stops; when the raking arm 33 rotates for raking, the raking arm 33 supports the supporting claw 38 for a certain angle and then smoothly rotates for raking via the rotating space of the supporting claw 38; and when the raking arm 33 moves reversely, the supporting claw 38 supports the raking arm 33 under the action of the limiting block 40, such that the raking arm 33 stops.

The rest is the same as embodiment 1.

Embodiment 9

Figure 26:
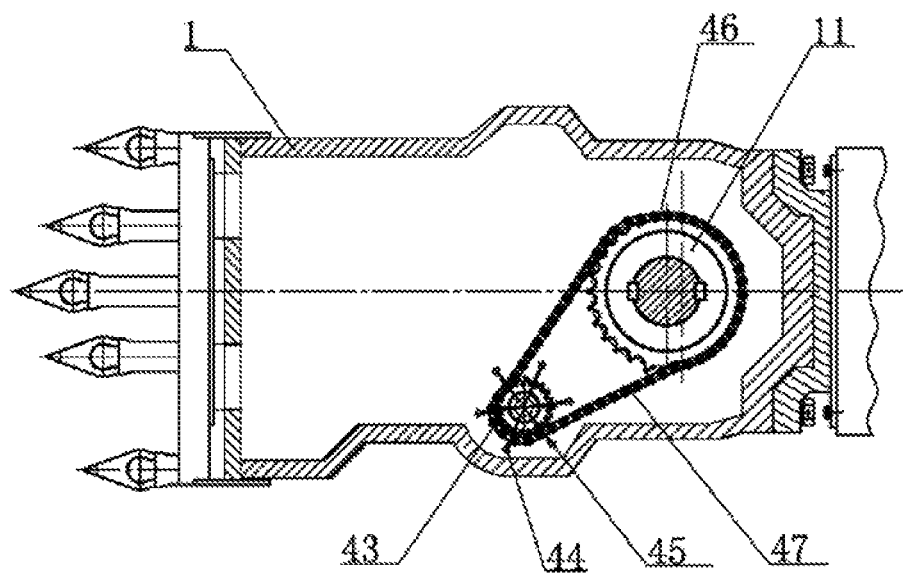
FIG. 26 is a structural schematic diagram of a non-concentric protruding shaft fixed bearing reciprocating impact part in embodiment 9.

As shown in FIG. 26, it shows a reciprocating impact part non-concentric protruding shaft fixed bearing method and a non-concentric protruding shaft fixed bearing reciprocating impact part for implementing the method in embodiment 9. This embodiment differs from embodiment 1 in that: the power shaft section 11 is provided with an oil throwing power component 46 and the like; an oil throwing mechanism 43 and the like are arranged in the case 1; the oil throwing mechanism 43 includes an oil throwing shaft 45, an oil thrower 44 and the like; the oil throwing power component 46 drives the oil throwing shaft 45 and the like, the oil throwing shaft 45 drives the oil thrower 44 and the like to rotate for throwing oil, the oil throwing shaft 45 and the like are arranged at the lower part of the case 1 to increase the oil throwing quantity, as shown in FIG. 26, and the oil throwing power component 46 is a sprocket chain oil throwing power component 47 or a belt pulley oil throwing power component or a gear rack oil throwing power component or a pin tooth type oil throwing power component or a rope and rope winder oil throwing power component or a gear oil throwing power component or a hanging tooth oil throwing power component or the like.

The problems that the non-concentric protruding shaft needs to be lubricated and cooled and the like are solved by sufficiently using the power on the power shaft section, so that eccentric shaft section bearings, power shaft section bearings and the like are well lubricated, and the service life of equipment is prolonged.

The rest is the same as embodiment 1.

Embodiment 10

Figure 27:
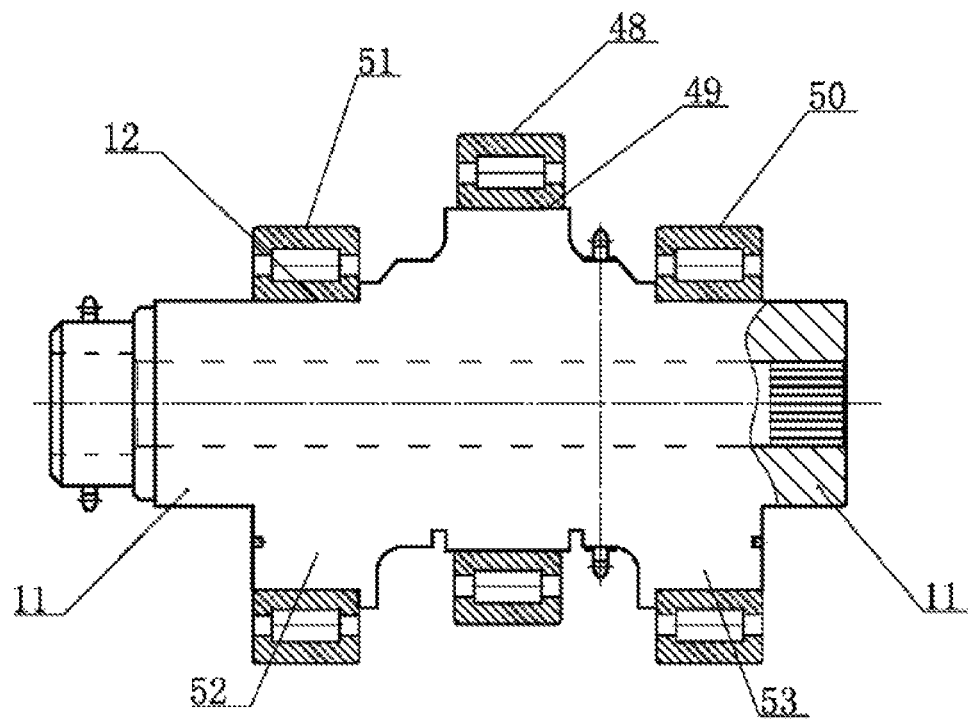
FIG. 27 is a structural schematic diagram of a non-concentric protruding shaft fixed bearing reciprocating impact part in embodiment 10.

As shown in FIG. 27, it shows a reciprocating impact part non-concentric protruding shaft fixed bearing method and a non-concentric protruding shaft fixed bearing reciprocating impact part for implementing the method in embodiment 10. This embodiment differs from embodiment 1 in that: the eccentric shaft sections 12 include a middle eccentric shaft section 49, a left eccentric shaft section 52, a right eccentric shaft section 53 and the like; the diameter of the middle eccentric shaft section 49 is greater than that of the left eccentric shaft section 52 or the right eccentric shaft section 53; the eccentric shaft section bearings 8 include a middle eccentric shaft section bearing 48, a left eccentric shaft section bearing 51, a right eccentric shaft section bearing 50 and the like; the whole middle eccentric shaft section bearing 48 penetrates through the left eccentric shaft section 52 or the right eccentric shaft section 53 and is fixed on the middle eccentric shaft section 49, or the middle eccentric shaft section bearing 48 is a separate one 48.

More than two eccentric shaft sections are arranged at equal intervals in the radial direction of the power shaft section, so that the excavation efficiency of equipment is improved, the reciprocating impact discharge rotary raking multifunctional power shaft is stressed uniformly, and the equipment is long in service life and reliable in work.

The rest is the same as embodiment 1.

Embodiment 11

Figure 28:
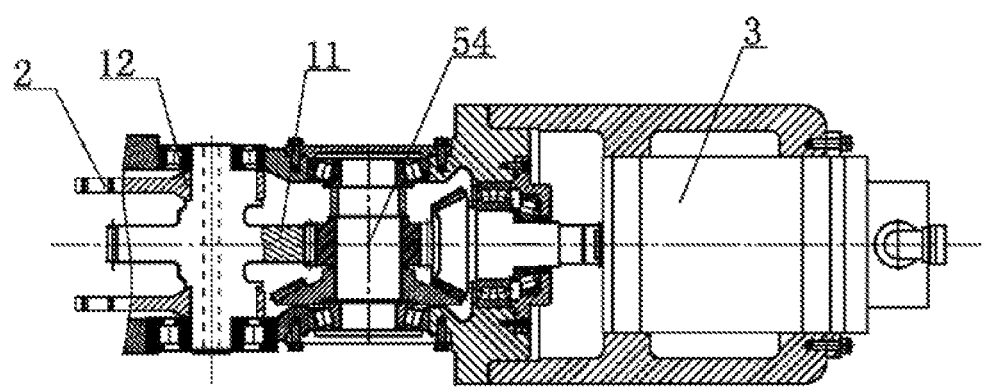
FIG. 28 is a first structural schematic diagram of a non-concentric protruding shaft fixed bearing reciprocating impact part in embodiment 11.
Figure 29:
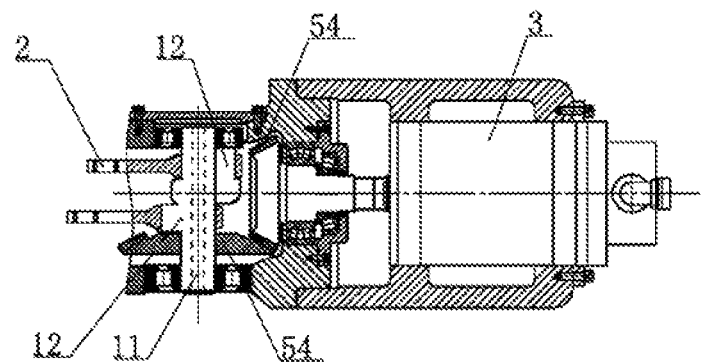
FIG. 29 is a second structural schematic diagram of the non-concentric protruding shaft fixed bearing reciprocating impact part in embodiment 11.
Figure 30:
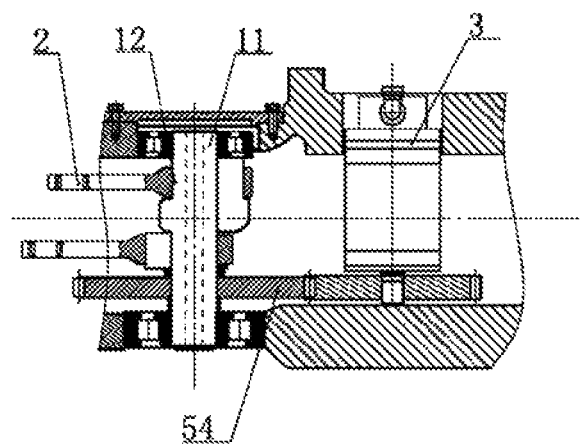
FIG. 30 is a third structural schematic diagram of the non-concentric protruding shaft fixed bearing reciprocating impact part in embodiment 11.
Figure 31:
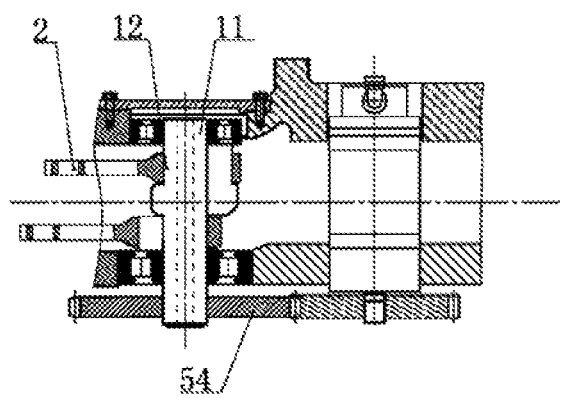
FIG. 31 is a fourth structural schematic diagram of the non-concentric protruding shaft fixed bearing reciprocating impact part in embodiment 11.

As shown in FIG. 28 to FIG. 31, they show a reciprocating impact part non-concentric protruding shaft fixed bearing method and a non-concentric protruding shaft fixed bearing reciprocating impact part for implementing the method in embodiment 11. The non-concentric protruding shaft fixed bearing reciprocating impact part further includes a driving transmission component 54 and the like; as shown in FIG. 28, the driving transmission component 54 is arranged between the eccentric shaft sections 12; as shown in FIG. 29, the driving transmission component 54 is arranged between the power shaft section 11 and the eccentric shaft section 12;

as shown in FIG. 30 and FIG. 31, the driving transmission component 54 is arranged on the power shaft section 11.

The driving transmission component and the like are arranged on the power shaft section or between the power shaft section and the eccentric shaft section or between the eccentric shaft sections, such that the driving transmission component of the non-concentric protruding shaft is beneficial to receiving power transmitted by the power source component from multiple positions and multiple angles.

The rest is the same as embodiment 1.

The present invention is not limited to the above implementations, equivalent variations or substitutions may be made by any skilled one who is familiar with this art without departing from the spirit of the present invention, and these equivalent variations or substitutions should be included within the scope defined by the claims of the present application.

The invention claimed is:

1. A reciprocating impact part non-concentric protruding shaft fixed bearing method, comprising the following steps:
   1) arranging eccentric shaft sections and power shaft sections, arranging eccentric shaft section bearings on the eccentric shaft sections, and arranging power shaft section bearings on the power shaft sections;
   2) arranging power shaft section bearing retaining rings and eccentric shaft section bearing retaining rings, such that the power shaft section bearing retaining rings and the eccentric shaft section bearing retaining rings respectively block the power shaft section bearings and the eccentric shaft section bearings, or the power shaft section bearing retaining rings and the eccentric shaft section bearing retaining rings are made into integrated non-concentric connected retaining sleeves, the external diameters of the power shaft section bearing retaining rings of the non-concentric connected retaining sleeves are smaller than the internal diameters of power shaft section bearing outer supporting rings, the external diameters of the eccentric shaft section bearing retaining rings are smaller than the internal diameters of eccentric shaft section bearing outer supporting rings, the power shaft section bearing retaining rings and the eccentric shaft section bearing retaining rings form height differences, and the spaces of the height differences avoid friction between the rotating eccentric shaft section bearing retaining rings and the power shaft section bearing outer supporting rings and/or avoid friction between the rotating power shaft section bearing retaining rings and the eccentric shaft section bearing outer supporting rings; arranging blocking sleeve rotating prevention components on the non-concentric connected retaining sleeves and the eccentric shaft sections and/or the non-concentric connected retaining sleeves and the power shaft sections, such that the blocking sleeve rotating prevention components prevent the non-concentric connected retaining sleeves from rotating relative to the power shaft sections and the eccentric shaft sections; arranging the non-concentric connected retaining sleeves between the power shaft section bearings and the eccentric shaft section bearings or between the eccentric shaft section bearings or between the eccentric shaft section bearings and power shaft section raking clutches;
   3) arranging connecting rods, and arranging the connecting rods as separate snap-fitted crankshaft connecting rods or integrated sleeved crankshaft connecting rods, and sleeving the integrated sleeved crankshaft connecting rods onto the eccentric shaft section bearings;
   4) arranging a case, and arranging the power shaft section bearings on the case, such that the power shaft section bearings support the power shaft sections and the eccentric shaft sections; and
   5) arranging a power source component, such that the power source component drives the power shaft sections to rotate, and the power shaft sections drive the connecting rods in reciprocating impact.

2. A non-concentric protruding shaft fixed bearing reciprocating impact part for implementing the reciprocating impact part non-concentric protruding shaft fixed bearing method according to claim 1, comprising power shaft sections, eccentric shaft sections, power shaft section bearings, eccentric shaft section bearings, power shaft section bearing retaining rings, eccentric shaft section bearing retaining rings, connecting rods, a power source component and a case, wherein the power shaft sections are separately connected or integrated with the eccentric shaft sections, the eccentric shaft section bearings are arranged on the eccentric shaft sections, the power shaft section bearings are arranged on the power shaft sections, the eccentric shaft section bearings are eccentric shaft section separate bearings or eccentric shaft section integrated bearings, the power shaft section bearing retaining rings and the eccentric shaft section bearing retaining rings respectively block the power shaft section bearings and the eccentric shaft section bearings, or the power shaft section bearing retaining rings and the eccentric shaft section bearing retaining rings are made into integrated non-concentric connected retaining sleeves, the external diameters of the power shaft section bearing retaining rings of the non-concentric connected retaining sleeves are smaller than the internal diameters of power shaft section bearing outer supporting rings, the external diameters of the eccentric shaft section bearing retaining rings are smaller than the internal diameters of eccentric shaft section bearing outer supporting rings, the power shaft section bearing retaining rings and the eccentric shaft section bearing retaining rings form height differences, the spaces of the height differences avoid friction between the rotating eccentric shaft section bearing retaining rings and the power shaft section bearing outer supporting rings and/or avoid friction between the rotating power shaft section bearing retaining rings and the eccentric shaft section bearing outer supporting rings, the non-concentric connected retaining sleeves are arranged between the power shaft section bearings and the eccentric shaft section bearings or between the eccentric shaft section bearings, blocking sleeve rotating prevention components are arranged on the non-concentric connected retaining sleeves and the eccentric shaft sections and/or the non-concentric connected retaining sleeves and the power shaft sections, the blocking sleeve rotating prevention components prevent the non-concentric connected retaining sleeves from rotating relative to the power shaft sections and the eccentric shaft sections, the connecting rods are separate snap-fitted crankshaft connecting rods or integrated sleeved crankshaft connecting rods, the integrated sleeved crankshaft connecting rods are sleeved onto the eccentric shaft section bearings, the power shaft section bearings are arranged on one side or two sides of the case, the power shaft section bearings support the power shaft sections and the eccentric shaft sections to rotate, and the power source drives the power shaft sections to drive the connecting rods in reciprocating impact.

3. The non-concentric protruding shaft fixed bearing reciprocating impact part according to claim 2, wherein the circle section center of the eccentric shaft section and the circle section center of the power shaft section are arranged in such a way: the circle section of the power shaft section is arranged within the circle section of the eccentric shaft section, the distance between the circle section center of the power shaft section and the circle section center of the eccentric shaft section is half of a reciprocating impact stroke, an eccentric shaft section integrated bearing is integrally installed on the eccentric shaft section, the power shaft section is separately connected or integrated with the eccentric shaft section, the non-concentric connected retaining sleeve is arranged between the power shaft section bearing and the eccentric shaft section bearing to block the power shaft section bearing and the eccentric shaft section bearing from shifting, a retaining shoulder is formed on one side of the eccentric shaft section, while the non-concentric connected retaining sleeve or a clamping spring or a retaining ring is arranged on the other side of the eccentric shaft section.

4. The non-concentric protruding shaft fixed bearing reciprocating impact part according to claim 2, wherein each power shaft section bearing retaining ring comprises a clamping spring or a spacer bushing.

5. The non-concentric protruding shaft fixed bearing reciprocating impact part according to claim 2, wherein the eccentric shaft section is provided with an anti-rotating hole or an anti-rotating groove, the non-concentric connected retaining sleeve is provided with a boss matched with the anti-rotating hole or the anti-rotating groove, and the boss is matched with the anti-rotating hole or the anti-rotating groove to prevent the non-concentric connected retaining sleeve from rotating relative to the eccentric shaft section.

6. The non-concentric protruding shaft fixed bearing reciprocating impact part according to claim 2, wherein an anti-rotating key is arranged in the internal diameter of the non-concentric connected retaining sleeve, the power shaft section and/or the eccentric shaft section are correspondingly provided with a key groove, and the anti-rotating key is pushed into the key groove to prevent rotating, or both the non-concentric connected retaining sleeve and the power shaft section are provided with the key groove, and the anti-rotating key is respectively arranged in the key grooves of the non-concentric connected retaining sleeve and the power shaft section.

7. The non-concentric protruding shaft fixed bearing reciprocating impact part according to claim 2, wherein the blocking sleeve rotating prevention component comprises an anti-rotating pin and a pin hole, the eccentric shaft section and/or the non-concentric connected retaining sleeve are provided with pin holes, the pin holes are through holes or blind holes, the anti-rotating pin is arranged in the pin hole to prevent the non-concentric connected retaining sleeve from rotating relative to the eccentric shaft section, the blind hole prevents the anti-rotating pin from dropping, the eccentric shaft section is provided with a blind hole, the non-concentric connected retaining sleeve is provided with a through hole, the anti-rotating pin penetrates through the through hole of the non-concentric connected retaining sleeve, one end of the anti-rotating pin is arranged in the blind hole of the eccentric shaft section while the other end is arranged in the through hole of the non-concentric connected retaining sleeve, the anti-rotating pin is prevented from dropping from the through hole of the non-concentric connected retaining sleeve by spot welding or gluing, or both the eccentric shaft section and the non-concentric connected retaining sleeve are provided with the blind hole, one end of the anti-rotating pin is arranged in the blind hole of the non-concentric connected retaining sleeve while the other end is arranged in the blind hole of the eccentric shaft section.

8. The non-concentric protruding shaft fixed bearing reciprocating impact part according to claim 2, wherein a retaining shoulder is formed on one side of the eccentric shaft section, while the non-concentric connected retaining sleeve is arranged on the other side, the retaining shoulder and the non-concentric connected retaining sleeve jointly prevent the eccentric shaft section bearing from shifting in the axial direction of the eccentric shaft section, and the internal diameter of the non-concentric connected retaining sleeve is snap-fitted with the power shaft section to realize radial positioning.

9. The non-concentric protruding shaft fixed bearing reciprocating impact part according to claim 2, wherein the non-concentric protruding shaft fixed bearing reciprocating impact part further comprises a raking mechanism, the raking mechanism comprises a raking transmission component, the raking transmission component and the power shaft section are separated or separately connected or integrated, the raking transmission component is arranged inside or outside the case, the raking mechanism further comprises a raking rotating component and a raking arm, the raking transmission component drives the raking rotating component to rotate, and the raking rotating component drives the raking arm to rotate for raking.

10. The non-concentric protruding shaft fixed bearing reciprocating impact part according to claim 9, wherein the raking transmission component is a raking transmission sprocket or a raking transmission gear or a raking transmission belt pulley or a raking transmission frictional wheel or a raking transmission coupling or a raking transmission spline sleeve or a raking clutch, the raking clutch is arranged on the raking rotating component or the power shaft section or the raking transmission component, and the non-concentric connected retaining sleeve is arranged between the eccentric shaft section bearing and the power shaft section raking clutch; when the raking arm needs to rotate for raking, the raking clutch drives the raking rotating component to drive the raking arm to rotate; during reciprocating impact discharge, the raking clutch enables the raking arm to stop rotating, thus preventing the raking arm from hindering the impact discharge; and the raking transmission component is separated from or integrated with the raking rotating component.

11. The non-concentric protruding shaft fixed bearing reciprocating impact part according to claim 2, wherein the case is provided with a rotating arm drop limiting mechanism; the rotating arm drop limiting mechanism comprises a supporting claw, a fixed shaft and a limiting block; the limiting block comprises an upper limiting block and a lower limiting block; the supporting claw swings between the upper limiting block and the lower limiting block, the limiting block is separately connected or integrated with the case, the fixed shaft is arranged on the case, the supporting claw is articulated with the fixed shaft, and the limiting block limits the supporting claw such that the supporting claw works or stops; when the raking arm rotates for raking, the raking arm supports the supporting claw for a certain angle and then smoothly rotates for raking via the rotating space of the supporting claw; and when the raking arm moves reversely, the supporting claw supports the raking arm under the action of the limiting block, such that the raking arm stops.

12. The non-concentric protruding shaft fixed bearing reciprocating impact part according to claim 2, wherein the power shaft section is provided with an oil throwing power component, an oil throwing mechanism is arranged in the case, the oil throwing mechanism comprises an oil throwing shaft and an oil thrower, the oil throwing power component drives the oil throwing shaft, the oil throwing shaft drives the oil thrower to rotate for throwing oil, the oil throwing shaft is arranged at the lower part of the case to increase the oil throwing quantity, and the oil throwing power component is a sprocket chain oil throwing power component or a belt pulley oil throwing power component or a gear rack oil throwing power component or a pin tooth type oil throwing power component or a rope and rope winder oil throwing power component or a gear oil throwing power component or a hanging tooth oil throwing power component.

13. The non-concentric protruding shaft fixed bearing reciprocating impact part according to claim 2, wherein more than two eccentric shaft sections are arranged in the same direction or arranged at equal intervals in the radial direction of the power shaft sections or arranged with angle differences formed in the radial direction of the power shaft sections.

14. The non-concentric protruding shaft fixed bearing reciprocating impact part according to claim 2, wherein the eccentric shaft sections comprise a middle eccentric shaft section, a left eccentric shaft section and a right eccentric shaft section; the diameter of the middle eccentric shaft section is greater than that of the left eccentric shaft section or the right eccentric shaft section; the eccentric shaft section bearings comprise a middle eccentric shaft section bearing, a left eccentric shaft section bearing and a right eccentric shaft section bearing; the whole middle eccentric shaft section bearing penetrates through the left eccentric shaft section or the right eccentric shaft section and is fixed on the middle eccentric shaft section, or the middle eccentric shaft section bearing is a separate one.

15. The non-concentric protruding shaft fixed bearing reciprocating impact part according to claim 2, further comprising a driving transmission component, wherein the driving transmission component is arranged on the power shaft section or between the power shaft section and the eccentric shaft section or between the eccentric shaft sections.

* * * * *